(12) United States Patent
Jin et al.

(10) Patent No.: US 11,514,329 B2
(45) Date of Patent: Nov. 29, 2022

(54) DATA-DRIVEN DEEP LEARNING MODEL GENERALIZATION ANALYSIS AND IMPROVEMENT

(71) Applicant: General Electric Company, Schenectady, NY (US)

(72) Inventors: Wen Jin, Fremont, CA (US); Zili Ma, San Ramon, CA (US); Min Zhang, San Ramon, CA (US); Gopal B. Avinash, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 832 days.

(21) Appl. No.: 16/366,455

(22) Filed: Mar. 27, 2019

(65) Prior Publication Data

US 2020/0311557 A1    Oct. 1, 2020

(51) Int. Cl.
| | |
|---|---|
| *G06N 3/08* | (2006.01) |
| *G06N 20/00* | (2019.01) |
| *G06F 17/18* | (2006.01) |
| *G06K 9/62* | (2022.01) |
| *G06N 3/04* | (2006.01) |

(52) U.S. Cl.
CPC .............. *G06N 3/088* (2013.01); *G06F 17/18* (2013.01); *G06K 9/6256* (2013.01); *G06K 9/6267* (2013.01); *G06N 3/0472* (2013.01); *G06N 20/00* (2019.01)

(58) Field of Classification Search
CPC .......... G06N 3/08; G06N 20/00; G06N 3/088; G06N 3/0472; G06N 3/04; G06K 9/6267; G06K 9/6256; G06K 9/62; G06F 17/18
See application file for complete search history.

(56) References Cited

U.S. PATENT DOCUMENTS

| | | | |
|---|---|---|---|
| 10,970,631 B2 * | 4/2021 | Sim ...................... | G06V 30/194 |
| 2011/0025834 A1 | 2/2011 | Chen et al. | |

(Continued)

OTHER PUBLICATIONS

Chen, et al., "Confidence Scoring Using Whitebox Meta-models with Linear Classifier Probes," arXiv:1805.05396v2 [cs.LG] Mar. 14, 2019, 9 pages.

(Continued)

*Primary Examiner* — Tuan H Nguyen
(74) *Attorney, Agent, or Firm* — Amin, Turocy & Watson, LLP

(57) ABSTRACT

Techniques are provided for evaluating and defining the scope of data-driven deep learning models. In one embodiment, a machine-readable storage medium is provided comprising executable instructions that, when executed by a processor, facilitate performance of operations comprising employing a machine learning model to extract first training data features included in a training data set and first target data features included in a target data set. The operations further comprise determining whether the target data set is within a defined data scope of the training data set based on analysis of correspondences between the first training data features and the first target data feature, and determining whether application of the target data set to a target neural network model developed using the training data set will generate results with an acceptable level of accuracy based on whether the target data set is within the defined data scope.

20 Claims, 11 Drawing Sheets

(56) References Cited

U.S. PATENT DOCUMENTS

2011/0119212 A1    5/2011    De Bruin et al.
2018/0204111 A1*   7/2018    Zadeh .................. G06N 3/0436

OTHER PUBLICATIONS

Gal, et al., "Dropout as a Bayesian Approximation: Representing Model Uncertainty in Deep Learning," First Date of Publication: Jun. 6, 2015. Proceedings of the 33 rd International Conference on Machine Learning, New York, NY, USA, 2016. JMLR: W&CP vol. 48. Copyright 2016 by the author(s).

Nair, et al., "Exploring Uncertainty Measures in Deep Networks for Multiple Sclerosis Lesion Detection and Segmentation," arXiv:1808.01200v2 [cs CV] Oct. 16, 2018, 9 pages.

Leibig, et al., "Leveraging uncertainty information from deep neural networks for disease detection," Scientific Reports (2017) 7:17816 | DOI:10.1038/s41598-017-17876-z. Received: Jul. 24, 2017, 14 pages.

Geifman, et al., "Selective Classification for Deep Neural Networks," 31st Conference on Neural Information Processing Systems (NIPS 2017), Long Beach, CA, USA. First Date of Publication: May 23, 2017, 10 pages.

Hendrycks, et al., "A Baseline for Detecting Misclassified and Out-of-Distribution Examples in Neural Networks," arXiv:1610.02136v3 [cs.NE] Oct. 3, 2018, 12 pages.

Salimans, et al., "Improved Techniques for Training GANs," arXiv:1606.03498v1 [cs.LG] Jun. 10, 2016, 10 pages.

Heusel, et al., "GANs Trained by a Two Time-Scale Update Rule Converge to a Local Nash Equilibrium," arXiv:1706.08500V6 [cs.LG] Jan. 12, 2018, 38 pages.

Deng, et al., "ImageNet: A Large-Scale Hierarchical Image Database," Published Online: Aug. 18, 2009, 8 pages.

Simonyan, et al., "Very Deep Convolutional Networks for Large-Scale Image Recognition," arXiv:1409.1556v6 [cs.CV] Apr. 10, 2015, 14 pages.

Lecun, et al., "Gradient-Based Learning Applied to Document Recognition," Proceedings of the IEEE, vol. 86, No. 11, Nov. 1998. Manuscript received Nov. 1, 1997, 46 pages.

Hull, "A Database for Handwritten Text Recognition Research," IEEE Transactions on Pattern Analysis and Machine Intelligence, vol. 16, No. 5, May 1994, Manuscript received Apr. 6, 1992; 5 pages.

Netzer, et al., "Reading Digits in Natural Images with Unsupervised Feature Learning," Dec. 16, 2011, 9 pages.

Wang, et al., "ChestX-ray8: Hospital-scale Chest X-ray Database and Benchmarks on Weakly-Supervised Classification and Localization of Common Thorax Diseases," arXiv:1705.02315v5 [cs.CV] Dec. 14, 2017, 19 pages.

He, et al., "Deep Residual Learning for Image Recognition," arXiv:1512.03385v1 [cs.CV] Dec. 10, 2015, 12 pages.

Huang, et al., "Densely Connected Convolutional Networks," arXiv:1608.06993v5 [cs.CV] Jan. 28, 2018, 9 pages.

Szegedy, et al., "Rethinking the Inception Architecture for Computer Vision," arXiv:1512.00567v3 [cs.CV] Dec. 11, 2015, 10 pages.

Liu, et al., "Isolation Forest," 2008 Eighth IEEE International Conference on Data Mining, Dec. 15, 2008, 10 pages.

Moya, et al., "Network Constraints and Multi-objective Optimization for One-class Classification," Neural Networks, vol. 9, No. 3, pp. 463-474, 1996, Received Nov. 2, 1993, 12 pages.

Younis, et al., "Leveraging Deep Learning Artificial Intelligence in Detecting the Orientation of Chest X-ray Images," Conference on Machine Intelligence in Medical Imaging, Sep. 22, 2019, 3 pages.

Chollet, et al., "Deep Learning with Python," ISBN 9781617294433, Manning Publications, Dec. 26, 2017, 386 pages.

Kingma, et al., "Adam: A Method for Stochastic Optimization," arXiv:1412.6980v9 [cs.LG] Jan. 30, 2017, 15 pages.

Non-Final Office Action received for U.S. Appl. No. 16/934,650 dated Jul. 21, 2022, 26 pages.

\* cited by examiner

DATA-DRIVEN DEEP LEARNING MODEL GENERALIZATION ANALYSIS AND IMPROVEMENT

TECHNICAL FIELD

This application generally relates to deep learning and more particularly to computer-implemented techniques for data-driven deep learning model generalization analysis and improvement.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that provide for techniques for data-driven deep learning model generalization analysis and improvement.

According to an embodiment, a system can comprise a memory that stores computer executable components and a processor that executes the computer executable components stored in the memory. The computer executable components can comprise, a data feature extraction component that employs a machine learning model to identify and extract training data features included in a training data set and a target data features included in a target data set, wherein a target neural network model was trained on the training data set. For example, in some implementations the machine learning model can comprises an adversarial autoencoder. The computer executable components can further comprise a data analysis component that determines a degree of correspondence between the training data set and the target data set based on comparison of the training data features and the target data features, and a target data acceptability component that determines whether application of the target neural network model to the target data set will generate results with an acceptable level of accuracy based on the degree of correspondence. In various implementations, the data analysis component can define a scope of the training data set based on the training data features and determine the degree of correspondence based on whether the target data features are within the scope of the training data set. The data analysis component can determine the degree of correspondence using a statistical analysis method or a machine learning method.

In some embodiments, the target data acceptability component can determine whether the application of the target neural network model to the target data set will generate the results with the acceptable level of accuracy based on a defined acceptability criterion. With these embodiments, the target data acceptability component can determine that the application of the target neural network model to the target data set will not generate the results with the acceptable level of accuracy based on failure of the degree of correspondence to meet the acceptability criterion.

In various embodiments, training data features comprise first training data features, the target data features comprise first target data features, and the computer executable components further comprise a model application component that applies a subset of layers of the target neural network model to the training data set and the target data set based on a determination that the degree of correspondence meets the acceptability criterion. With these embodiments, the computer executable components can further comprise a model feature extraction component that extracts second training data features generated based on application of the subset of layers to the training data set and extracts second target data features generated based on application of the subset of layers to the target data set. Also with these embodiments, the degree of correspondence determined by the data analysis component is a first degree of correspondence, and the computer executable components can further comprise a model analysis component that determines a second degree of correspondence between the second training data features and the second target data features. The target data acceptability component can further determine whether the application of the target neural network model to the target data set will generate the results with the acceptable level of accuracy based on the second degree of correspondence.

In some implementations of these embodiments, the model analysis component defines a scope of the target neural network model based on the second training data features and determines the second degree of correspondence based on whether the second target data features are within the scope of the target neural network model. The model analysis component can also determine the second degree of correspondence using a statistical analysis method or a machine learning method. For example, in some implementations, the data analysis component and the model analysis component can respectively determine the first degree of correspondence and the second degree of correspondence using a same statistical analysis method or a same machine learning method.

In one or more implementations, the target data evaluation component can determine that the application of the target neural network model to the target data set will not generate the results with the acceptable level of accuracy based on failure of the second degree of correspondence to meet the acceptability criterion. Likewise, the target data evaluation component can determine that the application of the target neural network model to the target data set will generate the results with the acceptable level of accuracy based on a second determination that the second degree of correspondence meets the acceptability criterion for the second degree of correspondence.

In some embodiments, elements described in connection with the system can be embodied in different forms such as a computer-implemented method, a computer program product, or another form.

DETAILED DESCRIPTION

Figure 1:
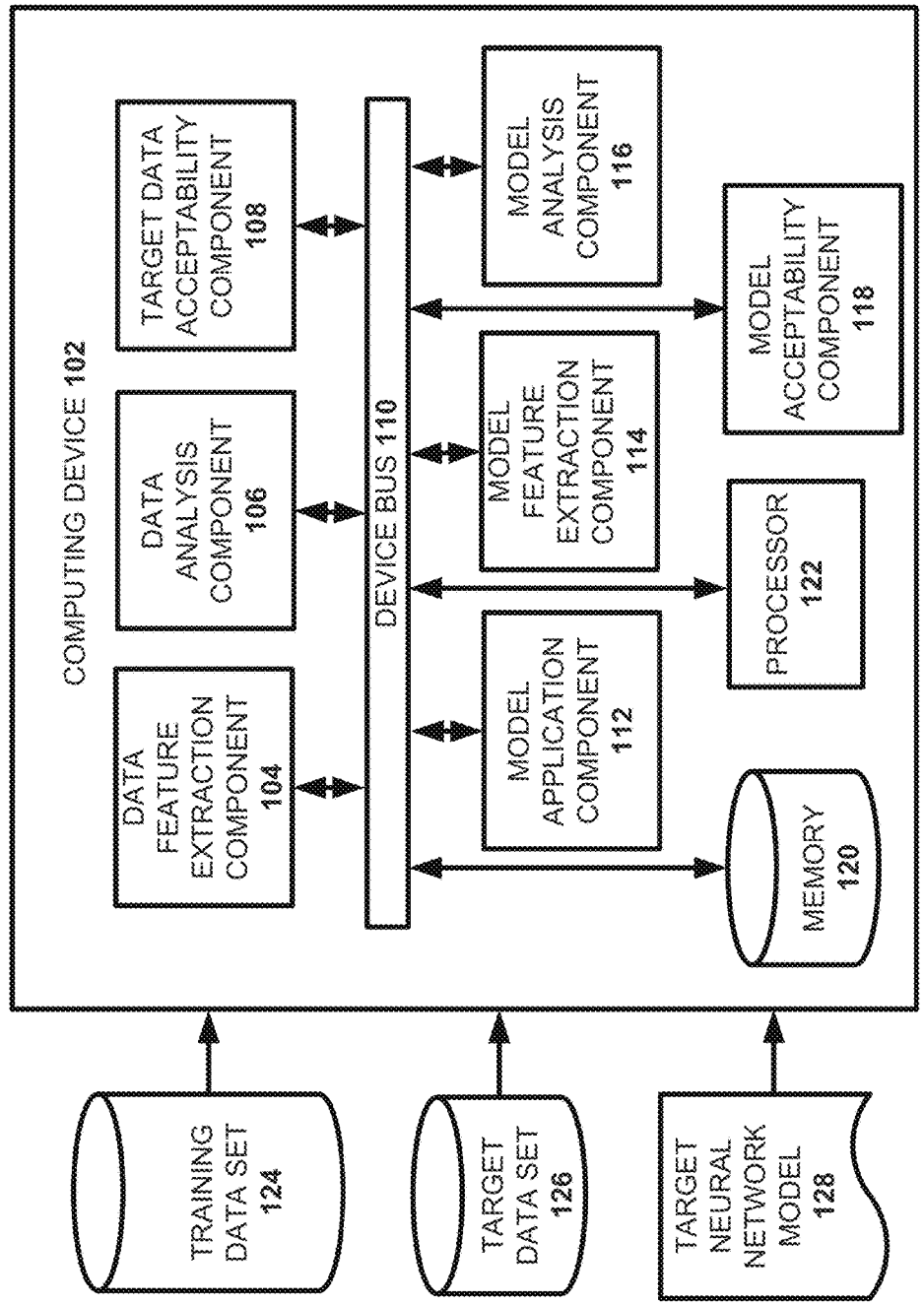
FIG. 1 illustrates a block diagram of an example, non-limiting system that facilitates evaluating and defining the scope of data-driven deep learning models in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate evaluating and defining the scope of data-driven deep learning models. A deep neural network (DNN) is an artificial neural network (ANN) with multiple layers between the input and output layers. The DNN finds the correct mathematical manipulation to turn the input into the output, whether it be a linear relationship or a non-linear relationship. DNNs have recently shown impressive performance, sometimes exceeding humans, in various artificial intelligence (AI) domains, including computer vision, speech, natural language processing, bioinformatics, drug design, medical image analysis, and more. These achievements were made possible by significant improvement in computation power as well as the availability of massive scale annotated datasets, leading to better inferencing performance than traditional models. However, the data-driven nature of deep learning models leads to challenges during the inferencing stage. In particular, one of the fundamental problems in data-driven based machine learning approaches is that the final model inferencing capability is limited by the scope of the training data used to develop the model.

The disclosed subject matter is directed to techniques for defining the application scope of a DNN model on new inferencing data based in part on the properties of the training data used to develop the model. In particular, the disclosed techniques employ statistical based and machine learning based methods to assess the model application scope due to the natural properties of the training data and the final model's generalizability limitations. The disclosed techniques further provide for identifying new data for potential processing by the model that may lead to inaccurate inferences and determining a confidence level/confidence boundary for ensuring accurate application of the model to new data. In various embodiments, the disclosed techniques employ a two-step process for determining the scope of a DNN model and determining whether the DNN model can provide accurate inferencing results based on a particular new data set, referred to herein as a target data set. The first step is referred to herein as the data scope evaluation step and the second step is referred to herein as the model scope evaluation step.

The first step of the two-step process, the data scope evaluation step, involves determining the scope of the training data set (also referred to herein as the reference data) used to develop and train the DNN model, and determining whether the target data set is within the scope of the training data set. In this regard, the first step is directed to determining whether a new data set that the DNN model encounters in the field is included within the statistical distribution of the training data that set that the DNN model was trained on. In one or more embodiments, the first step involves extracting a set of low-dimensional, related data features from the training data set (or reference data set) that was used to train the DNN model. The set of low-dimensional features extracted from the training/reference data set is referred to herein as first training data features. In various embodiments, the first training data features can be extracted from the training data set using a supervised or semi-supervised machine learning feature extraction method, such as using an adversarial autoencoder or the like. The same feature extraction method can further be employed to extract another set of low-dimensional related features from the target data set (e.g., the new data for potential processing by the DNN model). The set of low-dimensional features extracted from the target data set are referred to herein as the first target data features.

A statistical and/or machine learning analysis method can then be used to define the scope of the training/reference data set based on the first training data features, and to determine whether the target data set is within the scope of the training data set based on comparison of correspondences between the first training data features and the first target data features. For example, some suitable statistical analysis methods that can be used to determine whether the first target data features are within the scope of the first reference data features can include but are not limited to: standard score (also referred to as a Z-score or Z-value) analysis on each dimension, and Mahalanobis distance analysis on multi-dimensions. Some suitable machine learning analysis methods that can be used to determine whether the first target data features are within the scope of the first reference data features can include but are not limited to, T-distributed Stochastic Neighbor Embedding (t-SNE) analysis on lower dimension to get similarity distances, one-class support vector machine (SVM) classification for anomaly detection, and Isolation Forest for anomaly detection.

If based on the statistical and/or machine learning analysis, a determination is made that the first target data features are outside the scope of first training data features (e.g., meaning a low degree of correspondence is observed between the first training data features and the first target data features), it can be assumed that inferencing results that would be generated based on application of the DNN model to the target data set would likely be inaccurate. Accordingly, if the first target data features are outside the scope of first training data features, the target data set can be associated with a low confidence score representative of a low degree of confidence in the accuracy of the results that would be generated based on application of the DNN model to the target data set. In some implementations, the confidence score can correlate to a predicted level of accuracy of the results that would be generated based on application of the DNN model to the target data. For example, a confidence score of 80% could correspond to an accuracy level of 80%, or the like. In some embodiments, the disclosed techniques can generate a notification or warning indicating a determination that the target data set is associated with a low confidence score or otherwise outside the scope of the training data set. This notification or warning can be used to prevent application of the DNN model to the target data set or to otherwise adjust downstream weighting of inferences resulting from application of the DNN model to the target data.

The second step of the two-step process, the model scope evaluation step, is directed to evaluating the scope of the DNN model based on application of the DNN model to the training/reference data stet. In this regard, the structure of the DNN model, the number of hidden layers, the output parameters generated at each hidden layer, the number of parameters generated, and the like are controlled in part based on the training data used to develop and train the model. The second step-of the two-step process is used to determine whether and with what degree of confidence then DNN model can process the target data in a manner that is consistent with the training data set to produce accurate results in accordance with the results generated based on the training data set.

In various embodiments, the second step of the two-step process is performed only if the target data set is determined to be within the scope of the training data set in accordance with the first step analysis of the two-step process. For example, in one or more embodiments, if the data evaluation process results in a determination that the target data set is associated with a confidence score/level exceeding a minimum threshold such that the target data set can be considered within the scope of the training data set, the disclosed techniques can further proceed with the model scope evaluation. However, if the data evaluation process results in a determination that the target data set is associated with a low confidence score/level that fails to exceed a minimum threshold such that the target data set can be considered outside the scope of the training data set, the disclosed techniques can declare the target data set as inapplicable to the DNN model and forgo proceeding to the model scope evaluation step.

In accordance with the model scope evaluation step, a subset of layers of the DNN model (e.g., one or more layers of the DNN model excluding the final output layer) can be applied to the training data set to generate a first set of model-based features based on the training data set. This first set of model-based features or a subset of the first set of model-based features can be extracted as second training data features. The same subset of layers of the DNN model can also be applied to the target data set to generate a second set of model-based features. This second set of model-based features or a subset of the second set of model-based features can be extracted as second target data features. Using the same statistical and/or machine learning analysis method used in the first step, the scope of the DNN model can further be defined based on the second training data features, and the second target data features can be compared with the second training data features to determine whether the target data set is within the scope of the DNN model. If the second target data features are outside the scope of DNN model, (e.g., if the second target data features do not exhibit a high degree of correspondence with the second training data features), the target data set can be associated with a low degree of confidence that the DNN model will generate accurate results when applied to the target data set. A notification or warning can also be generated at this point indicating a determination that the target data set is associated with a low confidence score or otherwise outside the scope of the DNN model. This notification or warning can be used to prevent application of the DNN model to the target data or to otherwise adjust downstream weighting of inferences resulting from application of the DNN model to the target data.

However, if the second target features are within the scope of the DNN model, (e.g., the second target data features are within the scope of the second reference data features), the target data set can be associated with a high degree of confidence that the DNN model will generate accurate results when applied to the target data set. In other words, if the second target features are within the scope of the second reference features, the target data set can be associated with a high degree of confidence that model performance based on the target data set would have similar performance as did on the training/reference data set. In some embodiments, based on a first determination at the first step (the data evaluation step) that the target data set is within the scope of the reference data set and a second determination at the second step (the model evaluation step) that the target data set is within the scope of the DNN model, the target data can be authorized for application to the DNN model. In addition, results generated based on application of the DNN model to the target data set can be associated with a high degree of accuracy (e.g., in accordance with a predefined accuracy scale).

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates evaluating and defining the scope of data-driven deep learning models in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, in the embodiment shown, system 100 includes a computing device 102 that includes several machine-executable components, including (but not limited to), data feature extraction component 104, data analysis component 106, target data acceptability component 108, model application component 112, model feature extraction component 114, model analysis component 116 and model acceptability component 118. System 100 also includes various data sources and/or data structures comprising information that can be used by and/or evaluated by one or more components of the computing device 102. For example, in the embodiment shown, these data sources and/or data structures include a training data set 124, a target data set 126, and target neural network model 128. The computing device 102 can further include or be operatively coupled to at least one memory 120 and at least one processor 122. The at least one memory 120 can further store executable instructions (e.g., the data feature extraction component 104, the data analysis component 106, the target data acceptability component 108, the model application component 112, the model feature extraction component 114, and the model analysis component 116), that when executed by the at least one processor 122, facilitate performance of operations defined by the executable instruction. In some embodiments, the memory 120 can also store the various data sources and/or structures of system 100 (e.g., the training data set 124, the target data set 126, the target neural network model 128, and the like). In other embodiments, the various data sources and structure of system 100 can be stored in other memory (e.g., at a remote device or system), that is accessible to the computing device 102 (e.g., via one or more networks). Computing device 102 can further include a device bus 110 that couples the various components of the computing device to one another. Examples of said processor 122 and memory 120, as well as other suitable computer or computing-based elements, can be found with reference to FIG. 10, and can be used in connection with implementing one or more of the systems or components shown and described in connection with FIG. 1 or other figures disclosed herein.

System 100 and/or one or more components of the system 100 or other systems disclosed herein can be employed to use hardware and/or software to solve problems that are highly technical in nature, that are not abstract, and that cannot be performed as a set of mental acts by a human. In this regard, system 100 and/or components of system 100 can employ deep learning, statistical analysis and machine learning to determine and define the scope boundaries of data-driven DNN models (e.g., target neural network model 128) developed and trained based on massive amounts of training data (e.g., training data set 124). System 100/and/or components of system 100 further provide for determining data leading to the model application failures and determining a confidence region/confidence boundary for model application in the field. System 100 and/or one or more components of system 100 accomplish these goals by using a semi-supervised feature extraction method to extract low dimensional features that are the most important to the DNN model purpose (for example, classification), and tailoring application of the DNN model in that domain to improve the generalization.

In this regard, some of the processes performed by system 100 can be performed by specialized computers for carrying out defined tasks related to evaluating a DNN model (e.g., target neural network model 128) to automatically determine the scope of the DNN model after training and development of the DNN model. Based on the determined scope of the DNN model, one or more specialized computers and/or components of system 100 (and other systems described herein) can be used to automatically regulate application of the DNN model to new data sets (e.g., a target data set 126) in the field based on a determined level of confidence in the accuracy of the results that could be generated based on application of the DNN model to the new data sets. For example, system 100 and/or one or more components of system 100 can be used to prevent application of the DNN model to new data sets that are likely to produce inaccurate results, or to otherwise facilitate adjusting downstream weighting of inferences resulting from application of the DNN model to new data sets that are determined to be outside the scope of the DNN model.

Accordingly, system 100 and/or components of system 100 (and other systems described herein) can facilitate improving the accuracy of results generated based on application of DNN models (e.g., target neural network model 128) in the field while minimizing errors and downstream effects of inaccurate inferences generated based on DNN model application to new data sets. In this regard, system 100 and/or components of system 100 or other systems described herein can be employed to solve new problems that arise through advancements in technology, computer networks, the Internet, and the like, particularly advancement in AI solutions rooted in data-driven DNN based machine learning models.

In one or more embodiments, system 100 can employ a two-step process for determining the scope of a particular DNN model (e.g., target neural network model 128) that has been developed and trained on existing reference/training data, and determining whether the DNN model can provide accurate inferencing results if applied to a new data set. In the embodiment shown, the particular DNN model to be evaluated is identified as target neural network model 128 and the particular reference/training data set that was used to develop and train the target neural network model 128 is identified as training data set 124. The new data set that is evaluated for potential processing by the target neural network model 128 is identified as target data set 126. The type of the target neural network model 128 evaluated can vary. For example, the target neural network model 128 can include a DNN model that provides automated inferences in association computer vision, speech analysis, natural language processing, bioinformatics, drug design, medical image analysis, and the like.

The first step of the two-step process, referred to herein as the data scope evaluation step, involves determining the scope of the training data set 124 (also referred to herein as the reference data) used to develop and train the target neural network model 128, and determining whether the target data set 126 is within the scope of the training data set 124. In one or more embodiments, the data scope evaluation step involves data feature extraction component 104, data analysis component 106 and target data acceptability component 108.

The data feature extraction component 104 can perform a machine learning based feature extraction approach to extract low-dimensional related features or feature vectors from the training data set 124 and the target data set 126. In particular, the data feature extraction component 104 can employ a suitable feature extraction method that provides for automatically extracting a set of features or feature vectors for both data sets that reduce the dimensionality of the respective data sets to a smaller set of representative feature vectors. The set of features or feature vectors extracted from the training data set 124 are referred to herein as first training data features or first training data feature vectors. The set of feature vectors extracted from the target data set 126 are referred to herein as first target data features or first target data feature vectors.

The data feature extraction component 104 can employ the same feature extraction method to extract the first training data features from the training data set 124 and the first target data features from the target data set 126. In some embodiments, the data feature extraction component 104 can employ an auto encoder model, such as an adversarial auto encoder (AAE) model, to extract the first training data features and the first target data features. For example, the AAE model can include a model that was trained on a large-scale dataset (e.g., training data set 124) with or without labeled or annotated training data.

Figure 2:
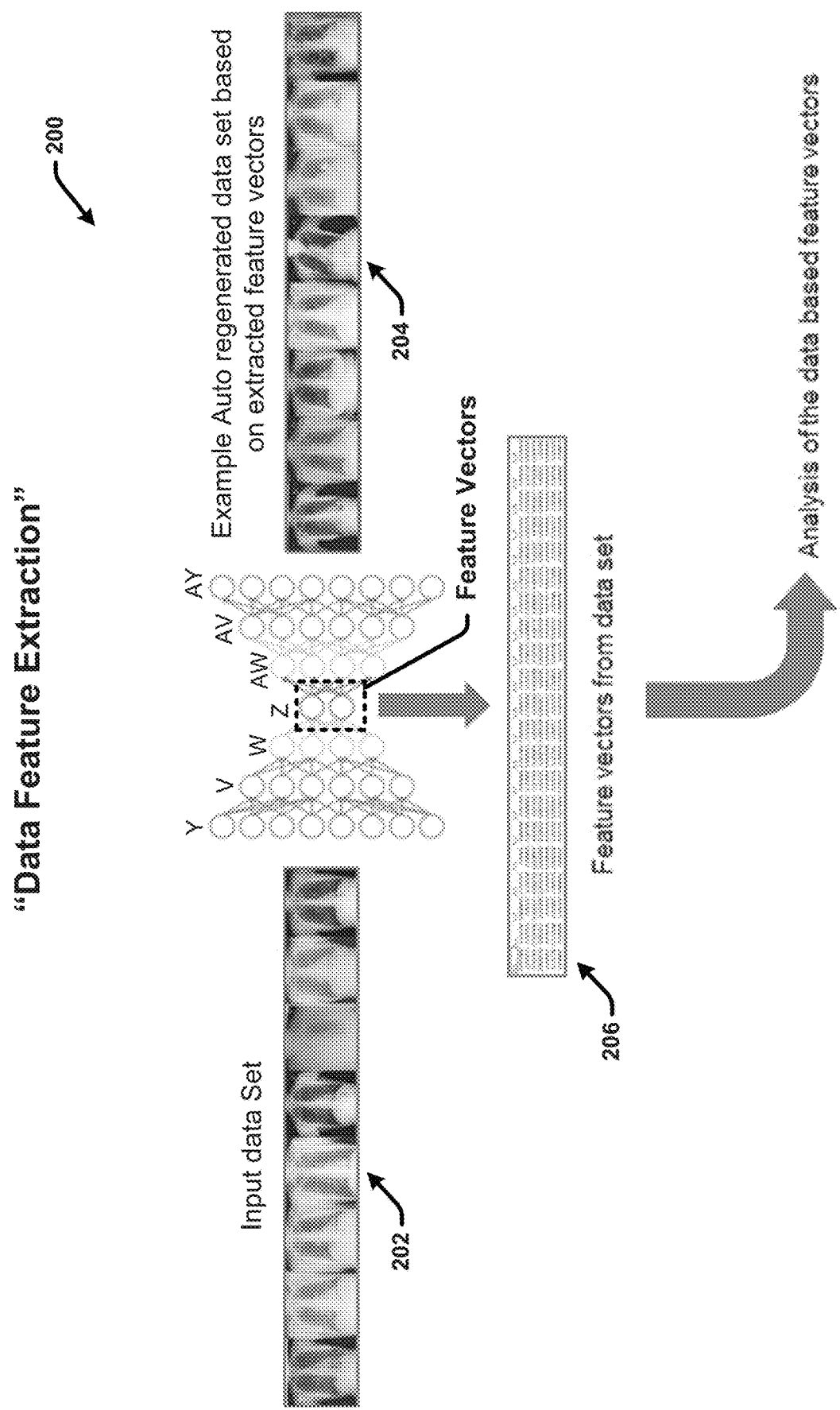
FIG. 2 illustrates is an example, non-limiting feature extraction method that facilitates evaluating and defining the scope of data-driven deep learning models in accordance with one or more embodiments of the disclosed subject matter.

FIG. 2 illustrates is an example, non-limiting feature extraction method 200 that facilitates evaluating and defining the scope of data-driven deep learning models in accordance with one or more embodiments of the disclosed subject matter. FIG. 2 demonstrates application of an AAE model to an input data set (e.g., input data set 202) to extract a set let of low-dimensional related feature vectors (e.g., feature vectors 206) from the input data set.

With reference to FIG. 2 in view of FIG. 1, in the embodiment shown in FIG. 2, the input data set 202 include a set of raw medical images. For example, in accordance with one example implementation, the target neural network model 128 can include a medical image analysis model (e.g., a Pneumothorax detection model) that is configured to generate inferences (e.g., classifications, diagnosis, etc.) based on analysis of raw medical images of a particular type. In accordance with the disclosed techniques, the data feature extraction component 104 can employ the data feature extraction method 200 to extract one set of feature vectors from the training data set 124 and another set of feature vectors from the target data set 126. In this regard, the input data set 202 shown in FIG. 2 can correspond to either the set of raw medical images used to develop and train the target neural network model 128 (e.g., the training data set 124), or a new set of raw medical images to be processed by the target neural network model 128 (e.g., the target data set 126).

In accordance with the exemplified AAE feature extraction method 200, the feature vectors 206 include a set of low-dimensional feature vectors that were extracted from the input data set 202. The feature vectors 206 represent the input data set 202 in a low-dimensional structured format such that the feature vectors 206 can be employed to essentially automatically regenerate the original, high-dimensional, raw input images with a minimum degree of accuracy required for classification purposes. For example, image data set 204 provides an example auto generated data set that can be generated based on the feature vectors 206. As can be seen with comparison of the image data set 204 to the original, input data set 202, the images generated based on the feature vectors 206 substantially correspond to the images of the input data set 202. In this regard, the extracted set let of (low-dimensional related) feature vectors 206 represent the raw input images (e.g., the input data set 202) in a uniform manner with reduced dimensionality relative to the raw input images. Although the visualization exemplified in FIG. 2 depicts low dimensionalities, wherein two nodes Z are used to represent the feature vectors from eight input images, it should be appreciated that the dimensionality of the input data set and the resulting extracted feature vectors can vary.

With reference again to FIG. 1, continuing with the data evaluation step, the data analysis component 106 can perform a comparison analysis of the first features/feature vectors extracted from the training data set 124 and the first features/feature vectors extracted from the target data set 126 set to determine whether the target data set 126 is within the scope of the training data set 124. In this regard, the data analysis component 106 can employ one or more statistical and/or machine learning analysis methods to define the scope of the training data set 124 based on the first training data features/feature vectors, and to determine whether the target data set 126 is within the scope of the training data set 124 based on comparison of correspondences between the first training data features/feature vectors and the first target data features/feature vectors. Some suitable statistical analysis methods that can be used to determine whether the first target data features are within the scope of the first reference data features can include but are not limited to: standard score (also referred to as a Z-score or Z-value) analysis on each dimension, and Mahalanobis distance analysis on multi-dimensions. Some suitable machine learning analysis methods that can be used to determine whether the first target data features are within the scope of the first reference data features can include but are not limited to, t-SNE analysis on lower dimension to get similarity distances, one-class SVM classification for anomaly detection, and Isolation Forest for anomaly detection.

In this regard, the data analysis component 106 can employ a suitable statistical and/or machine learning analysis method (e.g., those noted above) to compare the first training data features/feature vectors with the first target data features/feature vectors to determine a degree of correspondence between the first training data features/feature vectors and the first target data features/feature vectors. Depending on the statistical/machine learning analysis method used, the degree of correspondence can be based on a Z-score, a distance measurement, a distribution measurement, a percentage value, a combination of two or more similarity measurements, or the like. In this regard, the specific type of measurement data used to represent the degree of correspondence between the first training data features/feature vectors and the first target features/feature vectors can vary based on the type of statistical and/or machine learning comparative analysis method employed.

The target data acceptability component 108 can further evaluate the degree of correspondence measurement data determined by the data analysis component 106 to determine whether the target data set 126 exhibits an acceptable degree of correspondence with the training data set to be considered within the scope of the training data set 124. For example, in some embodiments, the target data acceptability component 108 can employ predefined acceptability criterion for the degree of correspondence measurement data. The predefined acceptability criterion can include for example, a predefined benchmark or threshold correspondence value. For instance, the predefined acceptability criterion can include a minimum Z-score, a maximum degree of deviation, a minimum percentage of correspondence value, a maximum degree of separation, or the like. In accordance with these embodiments, the target data acceptability component 108 can determine whether the target data set 126 is within the scope of the training data set 124 or otherwise exhibits an acceptable degree of correspondence with the training data set 124 based on whether the degree of correspondence measurement data meets the acceptability criterion. For example, in an implementation in which the correspondence data comprises a percentage value (e.g., X %) representative of a degree of correspondence between the first target data features/feature vectors and the first training data features/feature vectors and wherein the acceptability criterion comprises a minimum percentage correspondence value (e.g., Y %), the target data acceptability component 108 can determine that the target data set 126 is within the scope of the training data set 124 if the percentage of correspondence between the first target data features/feature vectors and the first training data features/feature vectors is greater than or equal to the minimum percentage correspondence value (e.g., if X % is ≥Y %).

In various embodiments, if the target data acceptability component 108 determines that the first target data features are outside the scope of first training data features (e.g., meaning a low degree of correspondence is observed between the first training data features and the first target data features), it can be assumed that inferencing results that would be generated based on application of the target neural network model 128 to the target data set 126 would likely be inaccurate. Accordingly, if the first target data features are outside the scope of first training data features (e.g., meaning the degree of correspondence between the first target data features and the first training data features fails to meet the acceptability criteria), the target data acceptability component 108 can associate the target data set 126 with a low confidence score representative of a low degree of confidence in the accuracy of the results that would be generated based on application of the DNN model to the target data set.

In some implementations, the confidence score can reflect a binary representation of the level of confidence in the target data set 126. For example, confidence score associated with a target data set 126 in association with the first step, the data analysis evaluation, can reflect either a "yes" indicating that the target data set is within the scope of the training data set and will therefore generate results with an acceptable level of accuracy, or a "no," indicating that the target data set is outside the scope of the training data set and will therefore generate results with an unacceptable level of accuracy. In other embodiments, the confidence score can correlate to a predicted level of confidence in the accuracy of the results that would be generated based on application of the DNN model to the target data. For example, a confidence score of 80% could correspond to a predicted level of confidence that the results would be accurate 80% of the time, or the like. In accordance with these embodiments, the degree of correspondence between the first training data features/feature and the target data features/feature vectors and directly correlate to the confidence score associated with the target data set 126 such that the higher the degree of correspondence, the higher the confidence score. The target data acceptability component 108 can further employ a predefined confidence level scoring scheme that associates defined confidence scores with defined degrees of correspondence.

In some embodiments, the degree of correspondence and/or the confidence score associated with the target data set 126 in association with the first step, the data scope evaluation process, can be used to prevent application of the target neural network model 128 to the target data set, or otherwise facilitate adjusting downstream weighting in result generated based on application of the target neural network model 128 to the target data set 126. For example, in some implementations, if the target data set 126 is determined to be outside the scope of the training data set 124, the target data set is determined to be associated with a low degree of correspondence with the training data set 124 and/or the target data set 126 is otherwise associated with a low confidence score (e.g., relative to a threshold confidence score), the target data acceptability component 108 can classify the target data set as inapplicable to the target neural network model 128. Based on a determination that the target data set is inapplicable to the target neural network model 128, in some embodiments, the target data acceptability component 108 can prevent application of the target neural network model 128 to the target data set 126 in the future. In other implementations, based on a determination that the target data set is inapplicable to the target neural network model 128, the target data acceptability component can prevent further analysis of the target data set 126 in accordance with the second step of the two-part process; the model scope evaluation process. In another example implementation, For example, if the target data set 126 is determined to be outside the scope of the training data set 124, the target data set is determined to be associated with a low degree of correspondence with the training data set 124 and/or the target data set 126 is otherwise associated with a low confidence score (e.g., relative to a threshold confidence score), results generated based on application of the target neural network model 128 to the target data set 126 can be associated with a warning or weighting that indicates a low degree of confidence in their level of accuracy.

Figure 3:
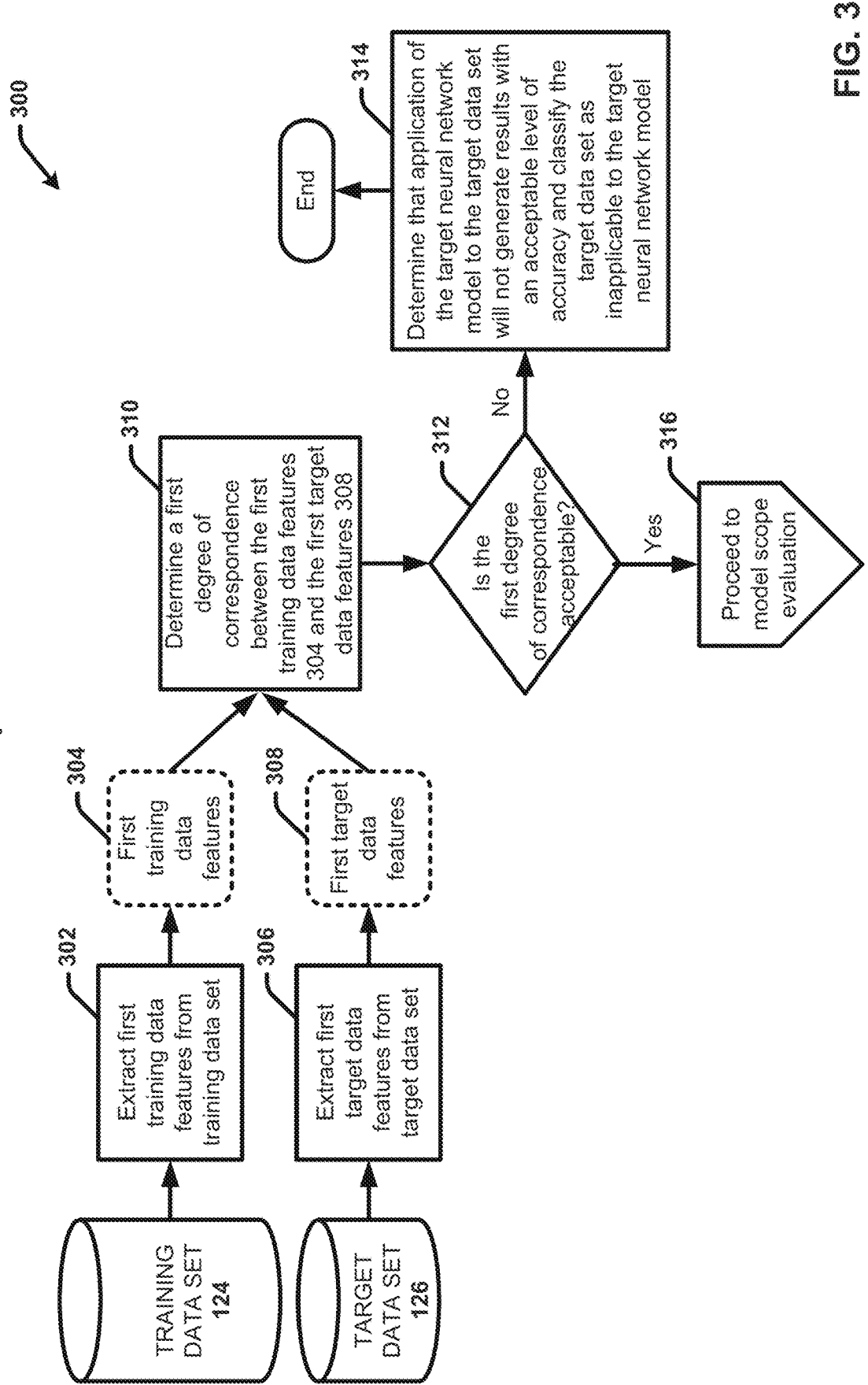
FIG. 3 illustrates a flow diagram of an example, non-limiting process for evaluating and defining the scope of input data for a data-driven deep learning model in accordance with one or more embodiments of the disclosed subject matter.

FIG. 3 illustrates a flow diagram of an example, non-limiting process 300 for evaluating and defining the scope of input data for a data-driven deep learning model in accordance with one or more embodiments of the disclosed subject matter. Process 300 provides a high-level flow diagram of the first step of the two-step analysis process described herein, the data scope evaluation process. In one or more embodiments, process 300 can be performed by the data feature extraction component 104, the data analysis component 106 and the target data acceptability component 108. Repetitive description of like elements employed in respective embodiment is omitted for sake of brevity.

With reference to FIG. 3 in view of FIG. 1, in accordance with process 300, at 302 first training data features 304 (e.g., feature vectors) can be extracted from the training data set 124 (e.g., using data feature extraction component 104). For example, in one or more embodiments, the data feature extraction component 104 can extract the first training data features 304 using method 200. At 306, first target data features 308 (e.g., feature vectors) can also be extracted from the target data set 126 (e.g., using data feature extraction component 104). For example, the data feature extraction component 104 can also extract the first training data features 304 using method 200. Although the specific method used to extract the first feature vectors from the training data set and the target data set can vary (e.g., can include other methods alternative to AEE), it should be appreciated that the data feature extraction component 104 employs the same method to extract the first training data features 304 and the first target data features 308.

At 310, a first degree of correspondence can then be determined between the first training data features 304 and the first target data features 308 (e.g., using data analysis component 106). For example, the data analysis component 106 can employ one or more statistical and/or machine learning based approaches (e.g., Z-score analysis on each dimension, Mahalanobis distance analysis on multi-dimensions, t-SNE analysis on lower dimensions to get similarity distances, one-class SVM classification for anomaly detection, Isolation Forest for anomaly detection, and the like) to determine the scope of the training data set 124 based on the first training data features 304 and to further determine a degree of correspondence between the first training data features 304 and the first target data features 308. In this regard, depending on the machine learning/analysis method employed, the data analysis component 106 can determine a z-score representative of the degree of correspondence between the first training data features 304 and the first target data features 308, a distance measurement representative of the degree of correspondence between the first training data features 304 and the first target data features 308, a percentage value representative of the degree of correspondence between the first training data features 304 and the first target data features 308, or the like.

At 312, the target data acceptability component 108 can then determine whether the first degree of correspondence is acceptable. For example, in some embodiments, the target data acceptability component 108 can determine whether a measurement value representative of the degree of correspondence meets an acceptability criterion (e.g., a minimum threshold, a maximum distance, a minimum z-score, a maximum degree of deviation, etc.). If a 312, the first degree of correspondence is determined to be acceptable, then process 300 can continue to the model scope evaluation at 316, step 2 of the two-part analysis described herein. (The model scope analysis is discussed infra with reference to FIG. 4). If, however at 312, the first degree of correspondence determined to be unacceptable, then process 300 can proceed to 314, wherein the target data acceptability component 108 determines that the application of the target neural network model to the target data set will not generate results with an acceptable level of accuracy and classifies the target data set as inapplicable to the target neural network model. In other words, based on the first degree of correspondence being less than an acceptable degree of correspondence, the level of confidence in the accuracy of the potential model results generated based on application of the model to the target data set is also considered unacceptable (e.g., too low).

For example, in some embodiments, in association with determining whether the first degree of correspondence between the first training data features 304 and the first target data features 308 is acceptable, the target data acceptability component 108 can also associate a confidence score with the target data set 126 representative of the degree of correspondence between the first training data features 304 and the first target data features 308. For example, in some implementations, the confidence score can be a binary value, representative of acceptable (e.g., within the scope of the training data set 124) or unacceptable (e.g., outside the scope of the training data set 124). In another embodiment, the confidence score can correspond to the degree of correspondence, such that the higher the degree of correspondence, the higher the confidence score. With these embodiments, the confidence score associated with the target data set 126 can be used to weigh or otherwise adjust downstream results generated based on application of the target neural network model 128 to the target data set.

Referring again to FIG. 1, the second step of the two-step process, the model scope evaluation step, is directed to evaluating the scope of the target neural network model 128 based on application of the target neural network model 128 to the training data set 124. In this regard, the structure of the target neural network model 128, the number of hidden layers, the output parameters generated at each hidden layer, the number of parameters generated, and the like are controlled in part based on the training data used to develop and train the model. The second step-of the two-step process can be used to determine whether and with what degree of confidence then DNN model can process the target data set 126 in a manner that is consistent with the training data set 124 to produce accurate results in accordance with the results generated based on the training data set 124. In various embodiments, the second step of the two-step process is performed only if the target data set 126 is determined to be within the scope of the training data set (e.g., if the first target data feature vectors exhibit an acceptable degree of correspondence with the first training data feature vectors) in accordance with the first step analysis of the two-step process, the data scope evaluation step. With these embodiments, if the target data set 126 is determined to be associated with an unacceptable degree of correspondence (e.g., relative to predefined acceptability criterion) with the training data set 124, the target data set 126 can be considered inapplicable to the target neural network model 128 and further analysis of the target data set in accordance with the model evaluation step can be omitted. In one or more embodiments, the model scope evaluation step involves the model application component 112, the model feature extraction component 114, the model analysis component 116, and target data acceptability component 108.

In accordance with the model scope evaluation, the model application component 112 can apply a subset of layers of the target neural network model 128 to both the training data set 124 and the target data set 126 to generate two sets of model-based features, one for the training data set and one for the target data set. The subset of layers can include one or more layers of the target neural network model 128 excluding the final output layer. For example, DNN models include a plurality of intermediary layers between the input and output layers. These intermediary layers can include for example, hidden layers, convolutional layers, fully connected layers, partially connected layers, and the like. These intermediary layers generate output parameters/features that are fed as inputs to subsequent downstream layers. Accordingly, model-based features generated based on application of a subset of the DNN model layers (e.g., one or more intermediary layers) to the training data set 124 and the target data set 126 are different from the data based extracted features/feature vectors extracted and evaluated in accordance with step-1 of the two-step analysis because the model-based features correspond to outputs of respective nodes and layers of the target neural network model 128. In this regard, the model-based features account for the manner in which the specific scope and structure of the DNN model has been trained to evaluate and process the training data set 124.

In accordance with the model scope evaluation, the same subset of layers of the target neural network model 128 can be applied to both the training data set 124 and the target data set 126 to generate these types of model-based features (e.g., outputs of the respective intermediary layers). The set of model-based features generated based on application of the subset of layers of the target neural network model 128 to the training data set 124 are referred to herein as second training data features or second training data feature vectors. The set of model-based features generated based on application of the subset of layers of the target neural network model 128 to the target data set 126 are referred to herein as second target data features or second target data feature vectors. In one or more embodiments, the model application component 112 can apply the subset of layers (e.g., one or more intermediary layers) of the target neural network model 128 to the training data set 124 to generate a first set of model-based features. The model feature extraction component 114 can further extract the second training data features/feature vectors from the first set of model based-features. The model application component 112 can further apply the same subset of layers (e.g., the one or more intermediary layers) of the target neural network model 128 to the target data set 126 to generate a second set of model-based features. The model feature extraction component 114 can further extract the second target data features/feature vectors from the second set of model based-features.

Using the same statistical and/or machine learning analysis method used by the data analysis component 106 in the first step, the model analysis component 116 can further determine or define the scope of the target neural network model 128 based on the second training data features/feature vectors, and compare the second target data features/feature vectors with the second training data features/feature vectors to determine whether the target data set is within the scope of the target neural network model 128. For example, the analytical method employed by the model analysis component 116 can include but is not limited to: Z-score analysis on each dimension, Mahalanobis distance analysis on multi-dimensions, t-SNE analysis on lower dimensions to get similarity distances, one-class SVM classification for anomaly detection, Isolation Forest for anomaly detection, and the like, (whichever was used by the data analysis component 106 to determine and evaluate the scope of the training data set 124 relative to the target data set 126).

In this regard, the model analysis component 116 can employ the same statistical and/or machine learning analysis method employed by the data analysis component 106 (e.g., one or more of those noted above) to compare the second training data features/feature vectors with the second target data features/feature vectors to determine a degree of correspondence between the second training data features/feature vectors and the second target data features/feature vectors. This degree of correspondence measurement data is additional to the first degree of correspondence measurement data determined by the data analysis component 106 in accordance with the first step of the two-step analysis process disclosed herein. For ease of explanation, the degree of correspondence determined by the data analysis component 106 representative of the degree of correspondence between the first training data features/feature vectors and the first target features/feature vectors is referred to herein as the "first degree of correspondence," and the degree of correspondence determined by the model analysis component 116 representative of the degree of correspondence between the second training data features/feature vectors and the second target features/feature vectors is referred to herein as the "second degree of correspondence."

As with the data scope analysis, depending on the statistical/machine learning analysis method used, this second degree of correspondence can be based on a Z-score, a distance measurement, a distribution measurement, a percentage value, a combination of two or more similarity measurements, or the like. In this regard, the specific type of measurement data used to represent the second degree of correspondence (e.g., the degree of correspondence between the second training data features/feature vectors and the second target features/feature vectors) can vary based on the type of statistical and/or machine learning comparative analysis method employed. Nevertheless, in one or more embodiments, because the data analysis component 106 and the model analysis component 116 apply the same statistical/machine learning comparative analysis method, both the first degree of correspondence measurement data and the second degree of correspondence measurement data will be the same type of measurement (e.g., both degrees of correspondences will comprises either a Z-score, a distance measurement, a distribution measurement, a percentage value, etc.)

The model acceptability component 118 can further evaluate the second degree of correspondence measurement data determined by the model analysis component 116 to determine whether the target data set 126 can be considered within the scope of the target neural network model 128. For example, in some embodiments, the model acceptability component 118 can also employ predefined acceptability criterion for the second degree of correspondence measurement data. This second predefined acceptability criterion can include for example, a predefined benchmark or threshold correspondence value (e.g., a minimum Z-score, a maximum degree of deviation, a minimum percentage of correspondence value, a maximum degree of separation, or the like). In accordance with these embodiments, the model acceptability component 118 can determine whether the second target data features/feature vectors exhibit an acceptable degree of correspondence with the second training data features/feature vectors such that the target data set 126 can be considered within the scope of the target neural network model 128 based on whether the second degree of correspondence measurement data meets the second acceptability criterion. In some embodiments, the second predefined acceptability criterion can be the same as the first predefined acceptability criterion used to evaluate the first degree of correspondence (e.g., the same threshold or benchmark value). In other embodiments, the second predefined acceptability criterion and the first predefined acceptability criterion can be different.

In various embodiments, if the model acceptability component 118 determines that the target data set 126 is outside the scope of the target neural network model 128 (e.g., meaning second degree of correspondence that does not meet the second acceptability criterion is observed between the second training data features/feature vectors and the second target data features/feature vectors), it can be assumed that inferencing results that would be generated based on application of the target neural network model 128 to the target data set 126 would likely be inaccurate. According to these embodiments, even if the target data set 126 was determined to be within the scope of the training data set 124 (e.g., in accordance with the data scope evaluation, step-1 of the two-step analysis), if the second target data features/feature vectors are outside the scope of second training data features/feature vectors, the model acceptability component 118 can associate the target data set 126 with a low confidence score representative of a low degree of confidence in the accuracy of the results that would be generated based on application of the target neural network model 128 to the target data set. In some embodiments, this confidence score can be a binary score reflective of a final determination that the target data set 126 is either applicable or inapplicable to the target neural network model 128. In other embodiments, this second confidence score can be non-binary and reflect the degree of correspondence between the second training data features/feature vectors and the second target data features/feature vectors. For example, the second confidence score can increase as the second degree of correspondence increases. In one or more embodiments, based a determination that the target data set 126 is outside the scope of the target neural network model 128 and/or association of the target data set 126 with an unacceptable confidence score (e.g., relative to a minimum confidence score), the model acceptability component 118 can prevent application of the target neural network model 128 to the target data set 126 or otherwise facilitate weighting results generated based on application of the target neural network model 128 to the target data set 126 accordingly.

However, if the second target features are within the scope of the target neural network model 128, (e.g., meaning that the second target data features/feature vectors exhibit an acceptable degree of correspondence with the second training data features/feature vectors), the target data acceptability component 108 can associate a high confidence score with the that the target neural network model 128, wherein the high confidence score reflects a high degree of confidence that the target neural network model 128 will generate accurate results when applied to the target data set 126. This (second) confidence score can be binary and/or increase as the second degree of correspondence increases. In this regard, based on a first determination at the first step (the data evaluation step) that the target data set 126 is within the scope of the training data set 124 and a second determination at the second step (the model evaluation step) that the target data set 126 is within the scope of the target neural network model 128, the target data acceptability component 108 can authorize the target data set 126 for application to the DNN model. In addition, results generated based on application of the DNN model to the target data set can be associated with a high degree of accuracy (e.g., in accordance with a predefined accuracy scale) that reflects the first and/or second degree of correspondence (e.g., determined at the data scope evaluation step and/or the model scope evaluation step).

In some embodiments, the model acceptability component 118 can determine a cumulative degree of correspondence score and/or confidence score for a target data set 126 that is a combination of the first degree of correspondence and the second degree of correspondence. For example, if the model acceptability component 118 determines that the first training data features/vectors and the first target data features/vectors exhibit a first degree of correspondence of 85%, and the target data acceptability component 108 further determines that the second training data features/vectors and the second target data features/vectors exhibit a second degree of correspondence of 95%, the model acceptability component 118 can generate a final "correspondence" or "confidence" score for the target data set 126 that is a function of a combination of both the first and second correspondence values (e.g., the mean of both values, which in this example would be 90%). In some implementations, the model acceptability component 118 can further determine whether to classify the target data as applicable or inapplicable to the target neural network model 128 based on this final correspondence or confidence score relative to a final acceptability criterion for the cumulative score. With these implementations, even if one of the first or second degree of correspondence measurements are low (e.g., relative to a predefined acceptability criterion benchmark value), the final correspondence or confidence score could still be high enough to classify the target data set as applicable to the target neural network model 128 if the other degree of correspondence measurement is high enough to cause the final, cumulative degree of correspondence measurement value to meet the final acceptability criterion. Thus, with these embodiments, even if the first degree of correspondence measurement determined in association with the data scope evaluation is low such that the target data set 126 is classified as outside the scope of the training data set 124, system 100 can be configured to proceed with the model scope evaluation, step-2 of the two-part analysis.

Figure 4:
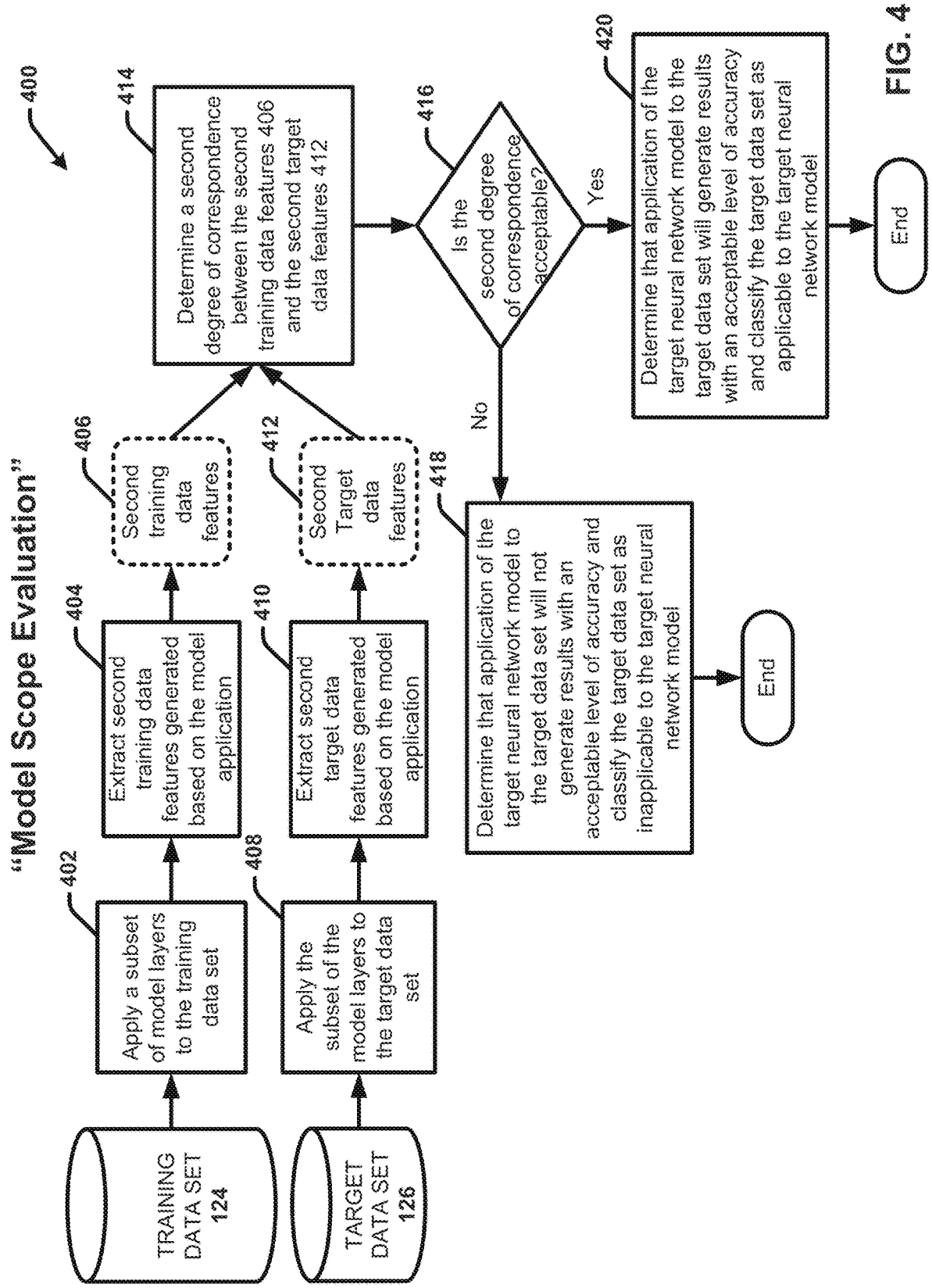
FIG. 4 illustrates a flow diagram of an example, non-limiting process for evaluating and defining the scope of model-dependent features of a data-driven deep learning model in accordance with one or more embodiments of the disclosed subject matter.

FIG. 4 illustrates a flow diagram of an example, non-limiting process for evaluating and defining the scope of model-dependent features of a data-driven deep learning model in accordance with one or more embodiments of the disclosed subject matter. Process 400 provides a high-level flow diagram of the first step of the two-step analysis process described herein, the data scope evaluation process. In one or more embodiments, process 400 can be performed by the model application component 112, the model feature extraction component 114, the model analysis component 116 and the model acceptability component 118. Repetitive description of like elements employed in respective embodiment is omitted for sake of brevity.

With reference to FIG. 4 in view of FIG. 1, in accordance with process 400, at 402 a subset of the model (e.g., the target neural network model 128) layers can be applied to the training data set 124 (e.g., by the model application component 112). At 404, second training data features 406 (e.g., feature vectors) can be extracted for the training data set 124 based on the application of the subset of model layers to the training data set (e.g., using model feature extraction component 114). For example, in one or more embodiments, the model feature extraction component 114 can extract model parameters generated based on application of the subset of model layers to the training data 122 set and generate the second training data features 406 based on the model parameters. At 408 the (same) subset of the model (e.g., the target neural network model 128) layers can be applied to the target data set 126 (e.g., by the model application component 112). At 410, second target data features 412 (e.g., feature vectors) generated based on application of the same subset of model layers to the target data set 126 can be extracted (e.g., using model feature extraction component 114). For example, in one or more embodiments, the model feature extraction component 114 can extract model parameters generated based on application of the subset of model layers to the target data set 126 set and generate the second training target feature vectors 406 based on these model parameters.

At 414, a second degree of correspondence can then be determined (e.g., by the model analysis component 116) between the second training data features 406 and the second target data features 412 (e.g., using Z-score analysis on each dimension, Mahalanobis distance analysis on multi-dimensions, t-SNE analysis on lower dimensions to get similarity distances, one-class SVM classification for anomaly detection, Isolation Forest for anomaly detection, and the like). For example, the model analysis component 116 can employ the same one or more statistical and/or machine learning based approaches used by the data analysis component 106 to determine the first degree of correspondence between the first training feature vectors and the first target feature vectors in accordance with the first step of the two-step analysis; the data scope evaluation (e.g., process 300). At 416, the model acceptability component 118 can then determine whether the second degree of correspondence is acceptable. For example, in some embodiments, the model acceptability component 118 can determine whether a measurement value representative of the degree of correspondence meets an acceptability criterion (e.g., a minimum threshold, a maximum distance, a minimum z-score, a maximum degree of deviation, etc.).

If at 416, the second degree of correspondence is determined to be unacceptable, then process 400 can proceed to 418, wherein the model acceptability component 118 determines that application of the target neural network model to the target data set will not generate results with an acceptable level of accuracy and classifies the target data set as inapplicable to the target neural network model. In this regard, based on the second level of accuracy being unacceptable (e.g., failing to satisfy a defined acceptability criterion), then the level of confidence in the accuracy of the potential model results generated based application of the target neural network model to the target data set 126 would also be unacceptable (e.g., too low). However, if at 416, the second degree of correspondence is determined to be acceptable, then process 400 can continue 420 wherein the model acceptability component 118 determines that application of the target neural network model to the target data set will generate results with an acceptable level of accuracy and classifies the target data set as applicable to the target neural network model.

In some embodiments, in association with determining whether the second degree of correspondence between the second training data features 406 and the second target data features 412 is acceptable, the model acceptability component 118 can also associate a (second) confidence score with the target data set 126 representative of the (second) degree of correspondence between the second training data features 406 and the second target data features 412. For example, in some implementations, the (second) confidence score can be a binary value, representative of acceptable (e.g., within the scope of the target neural network model 128) or unacceptable (e.g., outside the scope of the target neural network model 128). In another embodiment, the (second) confidence score can correspond to the (second) degree of correspondence, such that the higher the degree of correspondence, the higher the confidence score. With these embodiments, the (second) confidence score associated with the target data set 126 can be used to weigh or otherwise adjust downstream results generated based on application of the target neural network model 128 to the target data set.

For example, in some implementations, the target data set 126 can be associated with a first confidence score representative of the first degree of correspondence between the first training feature vectors and the first target feature vectors (e.g., in accordance with process 300). The target data set 126 can also be associated with a second confidence score representative of the second degree of correspondence between the second training data features 406 and the second target data features (e.g., in accordance with process 400). The first and/or second confidence scores can be used to control application of the target neural network model 128 to the target data set 126 in the field and/or to weigh the value of the results generated based on application of the target neural network model 128 to the target data set 126. For example, in some implementations, if the first and/or second confidence score, or a cumulative/final confidence score based on a combination of the first and second confidence scores, is less than a predefined confidence score benchmark or threshold, the model application component 112 can be configured to prevent application of the target neural network model 128 to the target data set 126 in the field. In another implementation, regardless of the final/cumulative confidence score associated with the target neural network model 128, system 100 (or another system) can choose to apply the target neural network model 128 to the target data set 126 yet weigh the accuracy of the results as a function of the cumulative/final confidence score.

Figure 5:
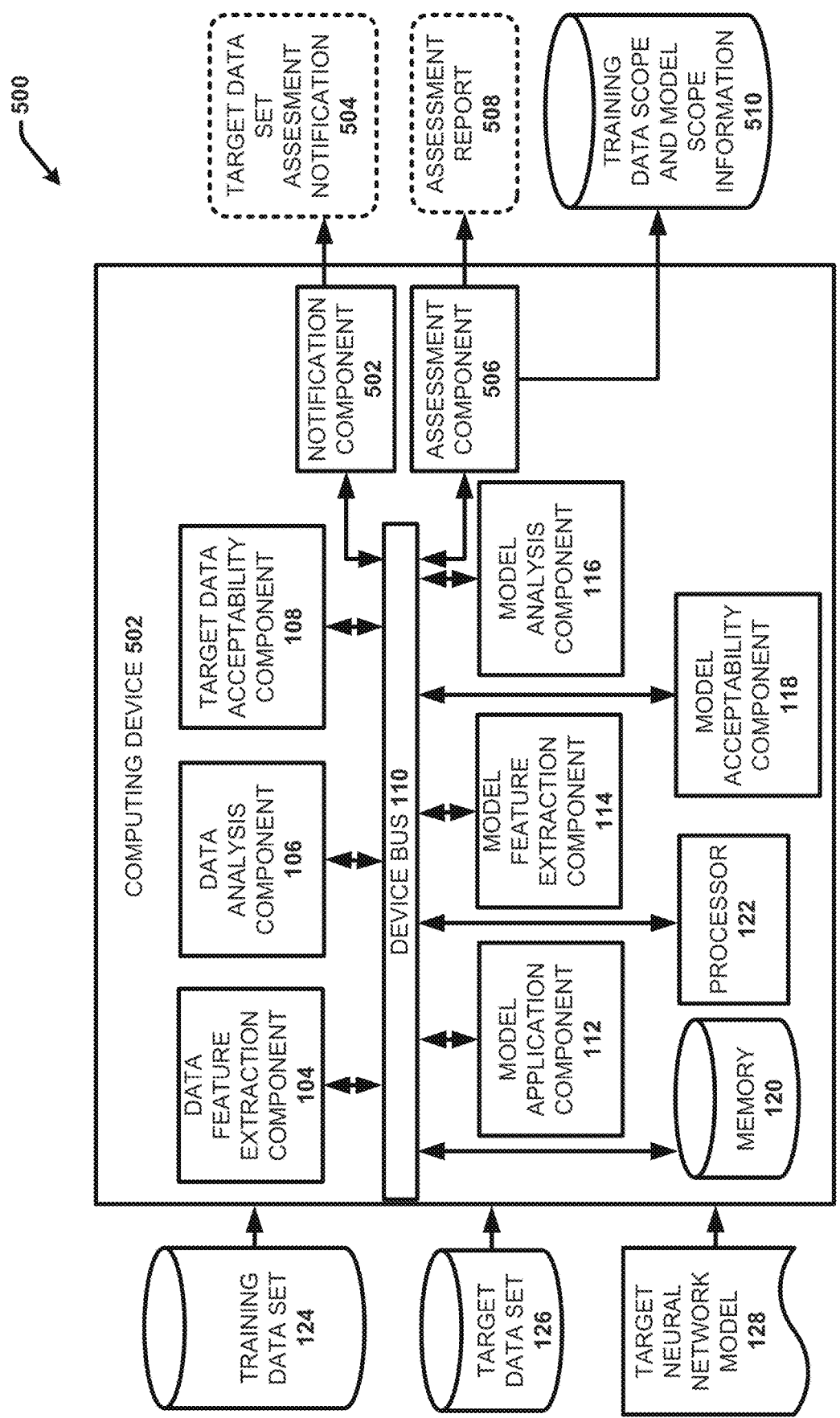
FIG. 5 illustrates a block diagram of another example, non-limiting system that facilitates evaluating and defining the scope of data-driven deep learning models in accordance with one or more embodiments of the disclosed subject matter.

FIG. 5 illustrates a block diagram of another example, non-limiting system 500 that facilitates evaluating and defining the scope of data-driven deep learning models in accordance with one or more embodiments of the disclosed subject matter. System 500 includes same or similar features as system 100 with the addition of notification component 502, assessment component 506, target data set assessment notification 504, assessment report 508 and training data scope and model scope information 510. Repetitive description of like elements employed in respective embodiments is omitted for sake of brevity.

In one or more embodiments, the notification component 502 can generate a notification or warning indicating a determination that the target data set 126 is associated a degree of correspondence that is less than an acceptable degree of correspondence, associated with a low confidence score and/or otherwise outside the scope of the training data set 124 (e.g., in accordance with the first step of the two-step analysis; the data scope evaluation, process 300) and/or the target neural network model 128 (e.g., in accordance with the second step of the two-step analysis; the model scope evaluation, process 400). In the embodiment shown, this notification is identified as target data set assessment notification 504. This notification or warning can be used to prevent application of the target neural network model 128 to the target data set (e.g., by the model application component 112) or to otherwise adjust downstream weighting of inferences resulting from application of the target neural network model 128 to the target data.

For example, in some implementations, if the target data acceptability component 108 determines that the target data set 126 is outside the scope of the training data set 124 in association with the data scope evaluation (e.g., based on the first target data features/feature vectors exhibiting a first degree of correspondence with the first training data features/feature vectors that is less than an acceptable degree of correspondence), the notification component 502 can generate a target data set assessment notification 504 for presenting or otherwise rendering to an entity (e.g., the model application component 112, a user interacting with software calling on the target neural network model 128 to generate an inference based on the target data set 126, or another suitable entity) responsible for applying the target neural network model 128. The notification can include information indicating that the target data set 126 is outside the scope of the training data set 124. In some implementations, in addition to indicating that the target data set 126 is inside or outside the scope of the training data set 124, the notification can also include information such as the first degree of correspondence, the acceptability criteria, a determined first level of confidence in the target data set 126 that reflects the first degree of correspondence, a predicted level of accuracy in potential results to be generated based on the target data set 126, and the like. Based on reception of the notification, the entity can use discretion as to whether to proceed with applying the target neural network model 128 to the target data set 126 or initiate an alternative (e.g., manual, user assisted process, or another review process) to evaluate the target data set 126. For example, if the target data set includes medical images and the target neural network model 128 is configured to generate an automated diagnosis based on the input medical images, based on reception of a notification that the target data set 126 is outside the scope of the training data set 124, the entity can assume the diagnoses results based on application of the target neural network model 128 to the target data set 126 have a relatively high probability of being inaccurate (e.g., wherein the probability is based on the first degree of confidence associated with the target data set 126). Accordingly, the entity can direct the attending physician or a group of expert physicians to manually review the input medical images in addition to and/or alternative to having the target neural network model 128 generate a diagnosis based on the images. In some embodiments, the notification component 502 can also generate a notification after the data scope analysis step including this type of information regarding the results of the data scope analysis step even if the target data set 126 is determined to be within the scope of the training data set 124.

The notification component 502 can similarly generate a target data set assessment notification 504 following the model scope analysis regarding the results of the model scope analysis step. For example, if the target data acceptability component 108 determines that the target data set 126 is outside the scope of the target neural network model 128 in association with the model scope evaluation (e.g., based on the second target data features/feature vectors exhibiting a second degree of correspondence with the second training data features/feature vectors that is less than an acceptable degree of correspondence), the notification component 502 can generate a target data set assessment notification 504 for presenting or otherwise rendering to the entity (e.g., the model application component 112, a user interacting with software calling on the target neural network model 128 to generate an inference based on the target data set 126, or another suitable entity) responsible for applying the target neural network model 128. The notification can include information indicating that the target data set 126 is outside the scope of the target neural network model 128, information identifying the determined second degree of correspondence, the acceptability criteria used to evaluate the second degree of correspondence, a determined second level of confidence in the target data set 126 that reflects the second degree of correspondence, a predicted level of accuracy in potential results to be generated based on the target data set 126, and the like. Based on reception of the notification, the entity can use discretion as to whether to proceed with applying the target neural network model 128 to the target data set 126 or initiate an alternative (e.g., manual, user assisted process, or another review process) to evaluate the target data set 126.

The assessment component 506 can be configured to generate and provide an assessment report 508 regarding the results of the data scope evaluation and/or the model scope evaluation applied to a particular target data set 126. For example, the assessment report can include the same type of information about the target data set 126 that can be included in a target data set assessment notification 504. However, the assessment report can be generated even if the target data set 126 is determined to be inside the scope of the training data set 124 and/or the inside the scope of the target neural network model 128. In some embodiments, the assessment report 508 can be used by a suitable entity to make determination regarding whether to apply the target neural network model 128 to the target data set 126 and/or determinations regarding how to consume and/or weigh results generated based on application of the target neural network model 128 to the target data set 126 (e.g., the model application component 112, a user, another system that applies the target neural network model 128, another component that provides recommendations regarding whether to apply the target neural network model 128, another component that evaluates and/or applies the results of the target neural network model 128, etc.).

The assessment component 506 can also be configured to generate and collate scope information generated by the data analysis component 106 regarding the determined scope of the training data set 124 and the determined scope of the model analysis component 116 regarding the determined scope of the target neural network model 128. This "scope information" can be collected in a suitable network accessible database and is identified in system 500 as training data scope and model scope information 510. For example, the scope information can include information for a particular training data set 124 that was used to develop and train a target neural network model 128 identifying the extracted first training data features/feature vectors for the training data set 124. The scope information can also include information that defines the scope of the training data set 124 based on the first training data features/feature vectors. The scope information can similarly include information for the target neural network model 128 that identifies the second training data feature/feature vectors and/or the scope of the target neural network model 128 determined based on the second training data features/feature vectors. This scope information can be used by the computing device 102 to evaluate and process additional target data sets in the futures with increased computation time/processing speed. For example, the data feature extraction component 104 can merely extract new first target data features vectors for the new target data set because the data analysis component 106 can perform its analysis by reusing the previously extracted first training data features included in the training data scope and model scope information 510. Similarly, the model application component 112 only has to apply the subset of model layers to the new target data set and the model feature extraction component 114 only has to extract new second target data features therefrom because the model analysis component 116 can reuse the original second training data features included in the training data scope and model scope information 510. In this regard, each time the computing device receives 102 a new data for potential application by the target neural network model 128, the computing device 102 can reuse the previously determined training data scope information and target neural network model 128 scope information, thereby enhancing the processing time required to evaluate the new target data set.

Figure 6:
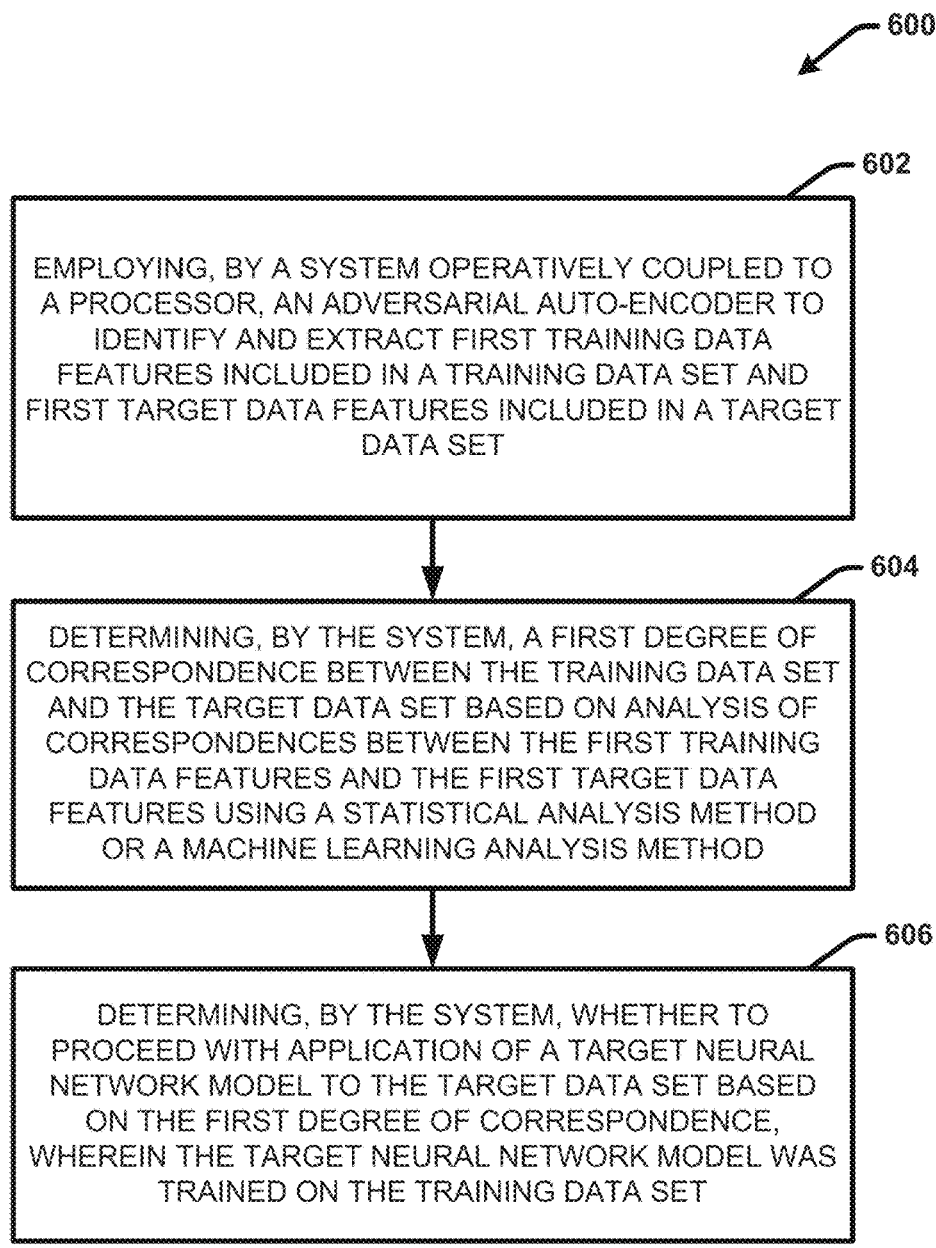
FIG. 6 provides a flow diagram of an example, non-limiting computer-implemented method that facilitates evaluating and defining the scope of data-driven deep learning models in accordance with one or more embodiments of the disclosed subject matter.

FIG. 6 provides a flow diagram of an example, non-limiting computer-implemented method 600 that facilitates evaluating and defining the scope of data-driven deep learning models in accordance with one or more embodiments of the disclosed subject matter. Repetitive description of like elements employed in respective embodiments is omitted for sake of brevity.

At 602, a system operatively coupled to a processor (e.g., system 100, system 500 or the like), can an AAE to identify and extract first training data features included in a training data set and first target data features included in a target data set (e.g., using data feature extraction component 104). At 604, the system can determine a first degree of correspondence between the training data set and the target data set based on analysis of correspondences between the first training data features and the first target data features using a statistical analysis method or a machine learning analysis method (e.g., using data analysis component 106). At 606, the system can determine whether to proceed with application of a target neural network model to the target data based on the first degree of correspondence, (e.g., using the target data acceptability component 108), wherein the target neural network model was trained on the training data set.

Figure 7:
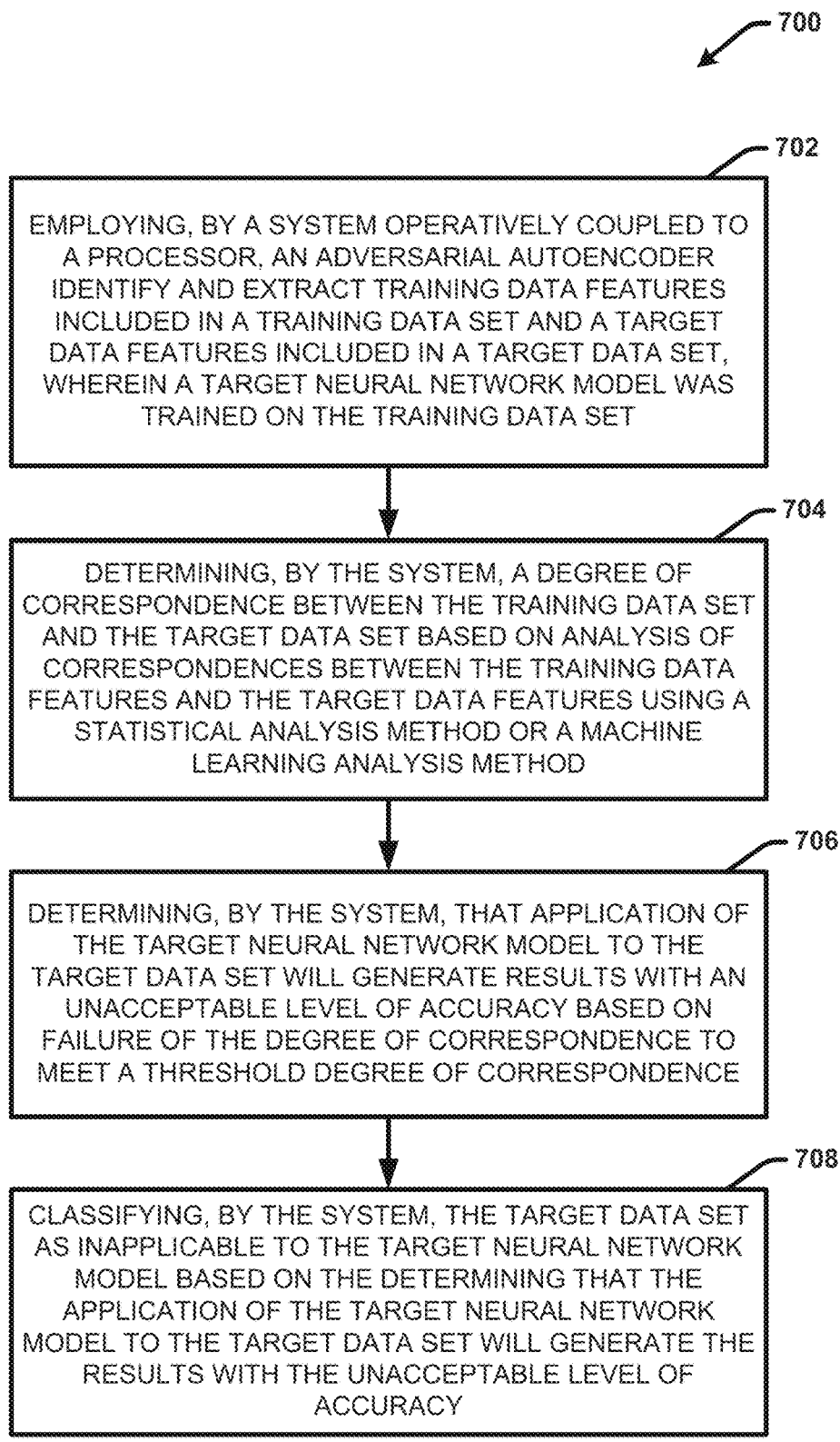
FIG. 7 provides a flow diagram of another example, non-limiting computer-implemented method that facilitates evaluating and defining the scope of data-driven deep learning models in accordance with one or more embodiments of the disclosed subject matter.

FIG. 7 provides a flow diagram of another example, non-limiting computer-implemented method 700 that facilitates evaluating and defining the scope of data-driven deep learning models in accordance with one or more embodiments of the disclosed subject matter. Repetitive description of like elements employed in respective embodiments is omitted for sake of brevity.

At 702, a system operatively coupled to a processor (e.g., system 100, system 500 or the like), can employ adversarial autoencoder to identify and extract training data features included in a training data set and a target data features included in a target data set, wherein a target neural network model was trained on the training data set (e.g., using data feature extraction component 104). At 704, the system can determine a degree of correspondence between the training data set and the target data set based on analysis of correspondences between the training data features and the target data features using a statistical analysis method or a machine learning analysis method (e.g., using data analysis component 106). At 706, the system can determine that application of the target neural network model to the target data set will generate results with an unacceptable level of accuracy based on failure of the degree of correspondence to meet a threshold degree of correspondence (e.g., using the target data acceptability component 108). At 708, the system can classify the target data set as inapplicable to the target neural network model based on the determining that the application of the target neural network model to the target data set will generate the results with the unacceptable level of accuracy.

Figure 8:
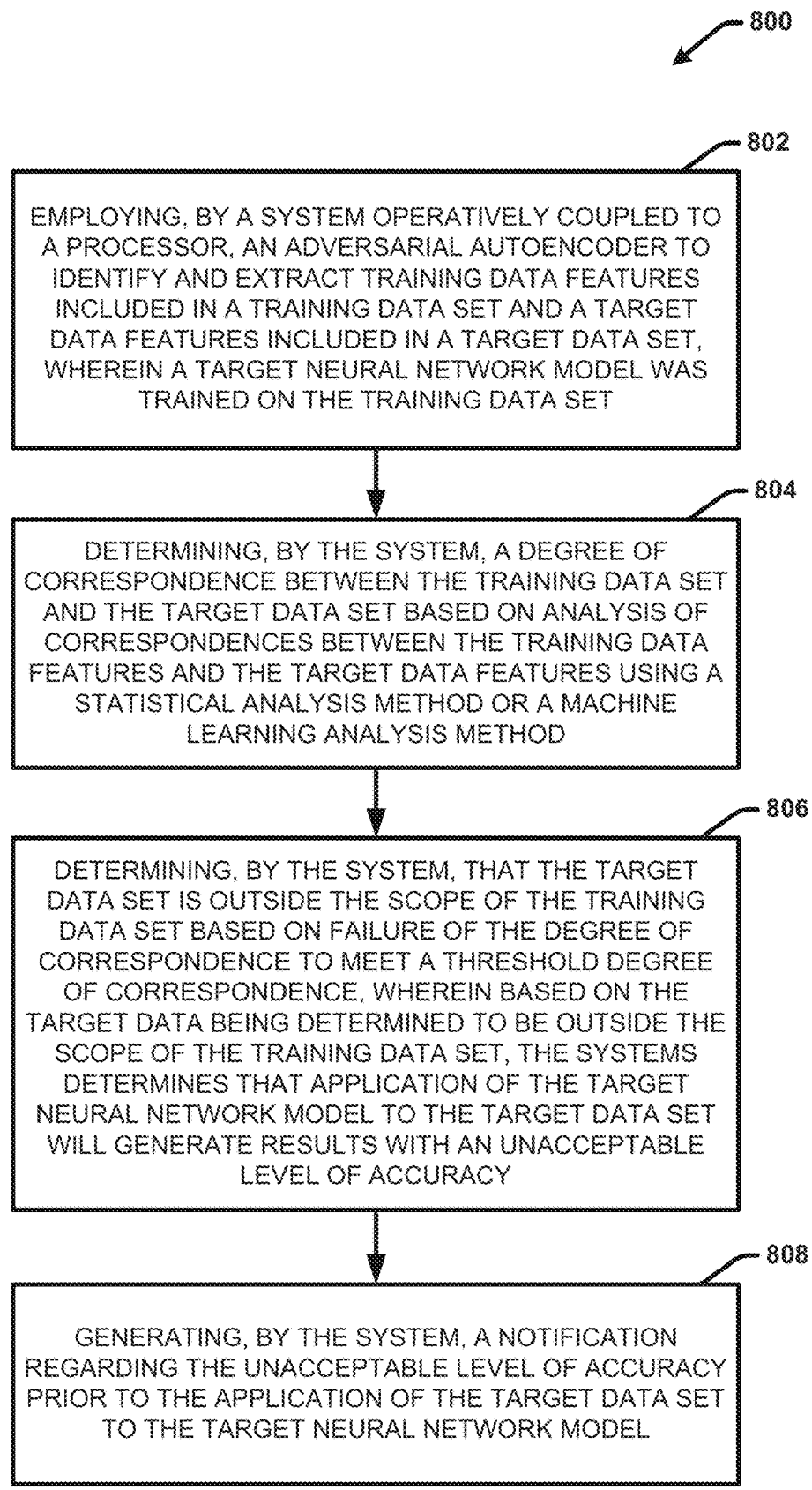
FIG. 8 provides a flow diagram of another example, non-limiting computer-implemented method that facilitates evaluating and defining the scope of data-driven deep learning models in accordance with one or more embodiments of the disclosed subject matter.

FIG. 8 provides a flow diagram of another example, non-limiting computer-implemented method 800 that facilitates evaluating and defining the scope of data-driven deep learning models in accordance with one or more embodiments of the disclosed subject matter. Repetitive description of like elements employed in respective embodiments is omitted for sake of brevity.

At 802, a system operatively coupled to a processor (e.g., system 100, system 500 or the like), can employ an adversarial autoencoder to identify and extract training data features included in a training data set and a target data features included in a target data set, wherein a target neural network model was trained on the training data set (e.g., using data feature extraction component 104). At 804, the system can determine a degree of correspondence between the training data set and the target data set based on analysis of correspondences between the training data features and the target data features using a statistical analysis method or a machine learning analysis method (e.g., using data analysis component 106). At 806, the system can determine that the target data set is outside the scope of the training data set based on failure of the degree of correspondence to meet a threshold degree of correspondence (e.g., using the target data acceptability component 108), wherein based on the target data set being determined to be outside the scope of the training data set, the system determines that application of the target neural network model to the target data set will generate results with an unacceptable level of accuracy. At 808, the system can generate a notification regarding the unacceptable level of accuracy prior to the application of the target data set to the target neural network model.

Figure 9:
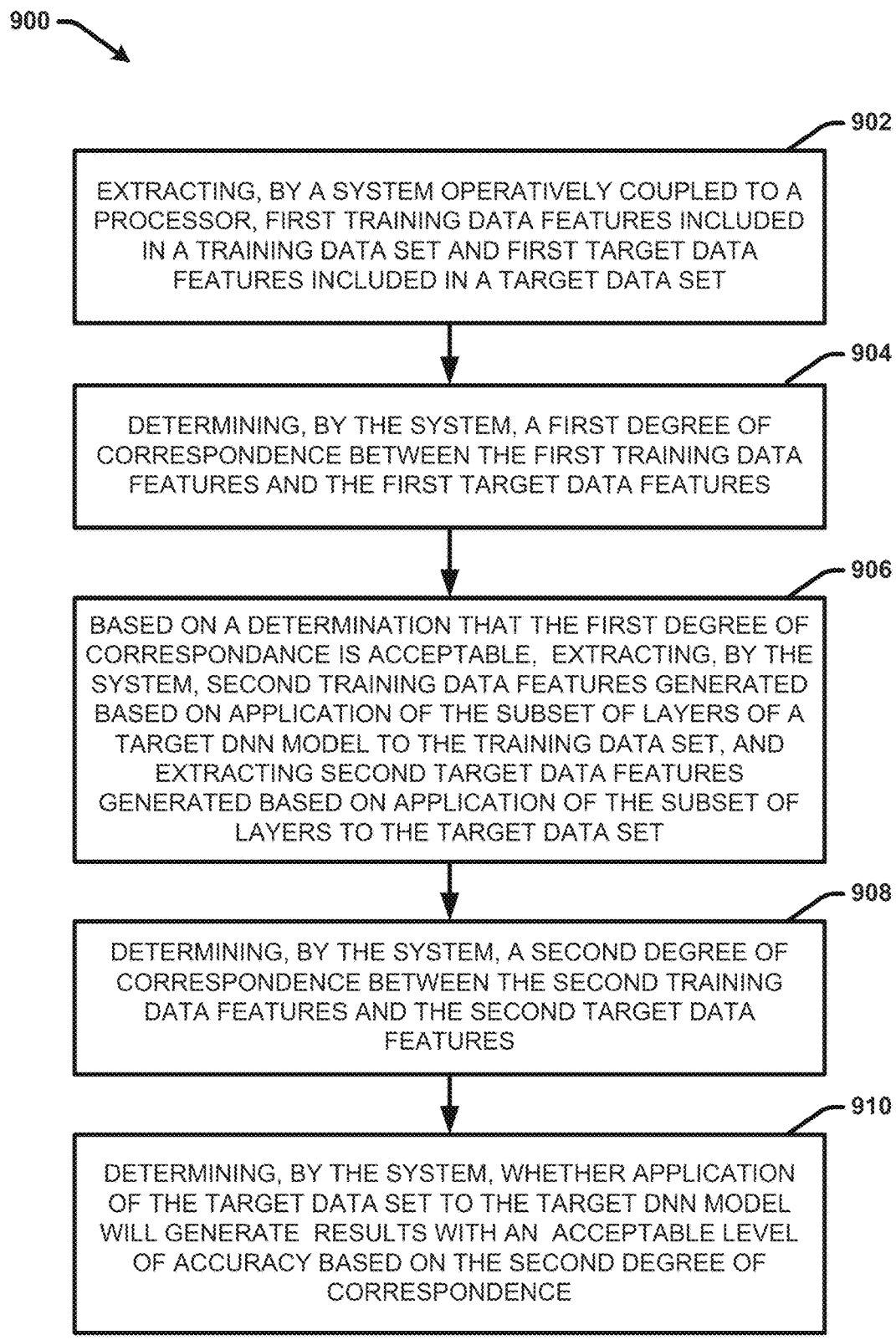
FIG. 9 provides a flow diagram of another example, non-limiting computer-implemented method that facilitates evaluating and defining the scope of data-driven deep learning models in accordance with one or more embodiments of the disclosed subject matter.

FIG. 9 provides a flow diagram of another example, non-limiting computer-implemented method 900 that facilitates evaluating and defining the scope of data-driven deep learning models in accordance with one or more embodiments of the disclosed subject matter. Repetitive description of like elements employed in respective embodiments is omitted for sake of brevity.

At 902, a system operatively coupled to a processor (e.g., system 100, system 500 or the like), can extract first training data features included in a training data set and first target data features included in a target data set (e.g., using data feature extraction component 104). At 904, the system can determine a first degree of correspondence between the first training data features and the first target data features (e.g., using data analysis component 106). At 906, based on a determination that the first degree of correspondence is acceptable (e.g., based on defined acceptability criteria), the system can further extract second training data features generated based on application of a subset of layers of a target neural network model to the training data set, and extract second target data features generated based on application of the subset of layers to the target data set (e.g., using the target data acceptability component 108, the model application component 112 and the model feature extraction component 114). At 908, the system can determine a second degree of correspondence between the second training data features and the second target data features (e.g., using model analysis component 116). At 910, the system can further determine whether the application of the target data set to the target neural network model will generate results with an acceptable level of accuracy based on the second degree of correspondence (e.g., using target data acceptability component 108).

Figure 10:
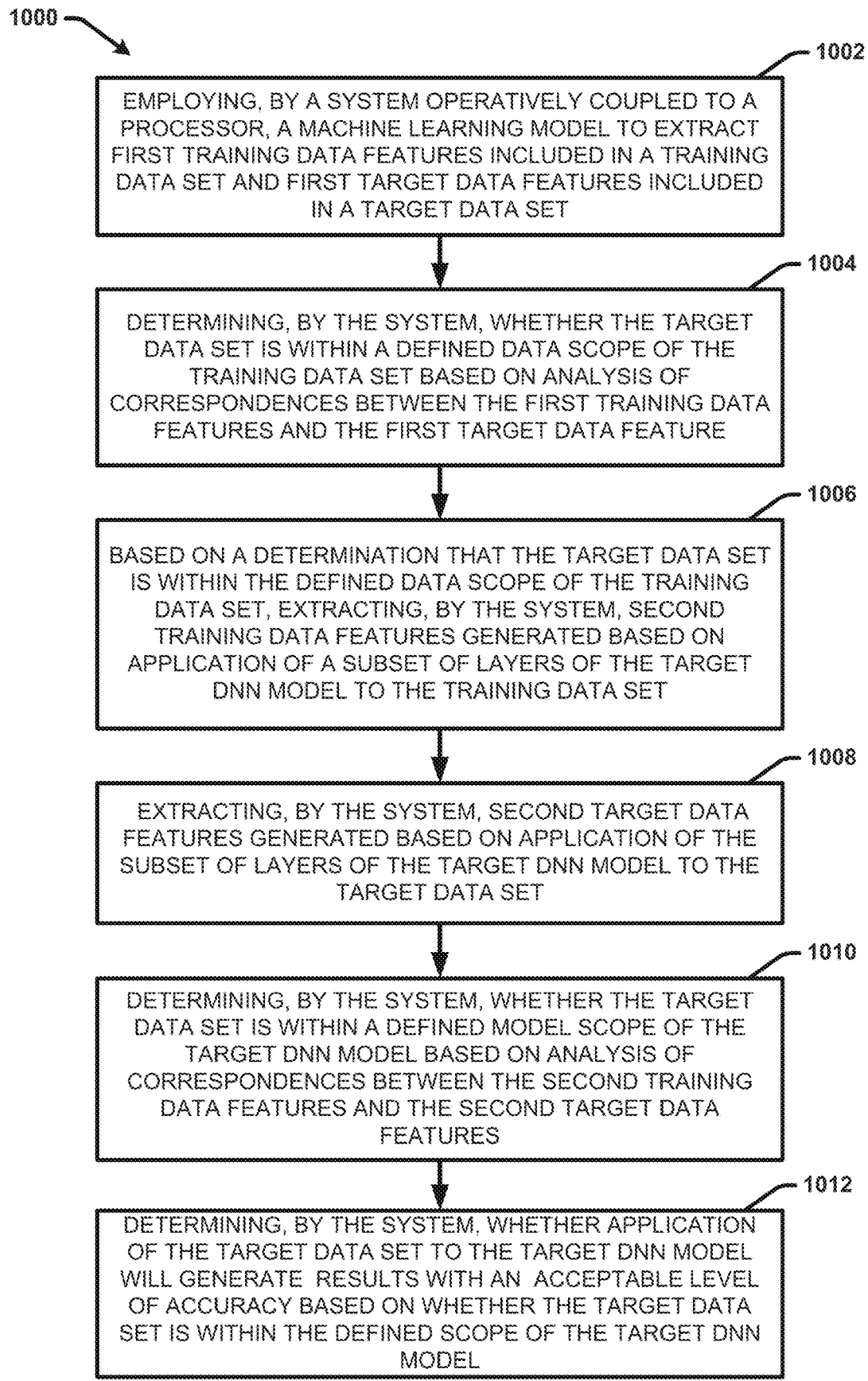
FIG. 10 provides a flow diagram of another example, non-limiting computer-implemented method that facilitates evaluating and defining the scope of data-driven deep learning models in accordance with one or more embodiments of the disclosed subject matter.

FIG. 10 provides a flow diagram of another example, non-limiting computer-implemented method 1000 that facilitates evaluating and defining the scope of data-driven deep learning models in accordance with one or more embodiments of the disclosed subject matter. Repetitive description of like elements employed in respective embodiments is omitted for sake of brevity.

At 1002, a system operatively coupled to a processor (e.g., system 100, system 500 or the like), can employ a machine learning model (e.g., an AAE) to extract first training data features included in a training data set and first target data features included in a target data set (e.g., using data feature extraction component 104). At 1004, the system can determine whether the target data set is within a defined data scope of the training data set based on analysis of correspondences between the first training data features and the first target data feature (e.g., using data analysis component 106 and target data acceptability component 108). At 1006, based on a determination that the target data set is within the defined data scope of the training data set, the system can further extract second training data features generated based on application of a subset of layers of the target neural network model to the training data set (e.g., via the model application component 112 and the model feature extraction component 114). At 1008, the system can extract second target data features generated based on application of the subset of layers of the target neural network model to the target data set (e.g., via the model application component 112 and the model feature extraction component 114). At 1010, the system can determine whether the target data set is within a defined model scope of the target neural network model based on analysis of correspondences between the second training data features and the second target data features (e.g., using model analysis component 116 and target data acceptability component 108). At 1012, the system can further determine whether the application of the target data set to the target neural network model will generate the results with the acceptable level of accuracy based on whether the target data set is within the defined scope of the target neural network model (e.g., using target data acceptability component 108).

One or more embodiments can be a system, a method, and/or a computer program product at any possible technical detail level of integration. The computer program product can include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 11:
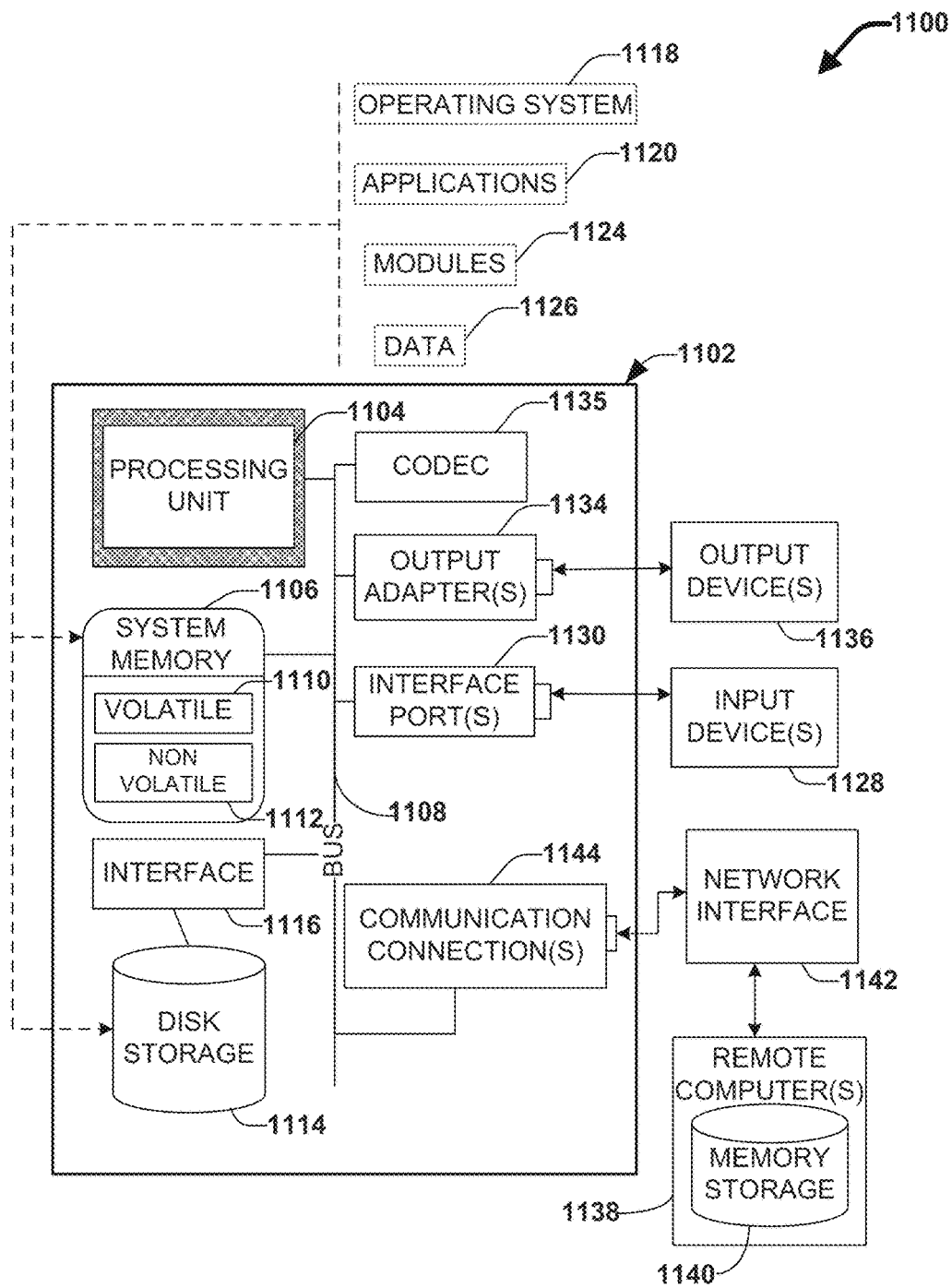
FIG. 11 illustrates a block diagram of an example, non-limiting operating environment in which one or more embodiments described herein can be facilitated.

With reference to FIG. 11, an example environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1112, which can employ one or more of the disclosed memory architectures, in various embodiments. The basic input/output system (BIOS), containing the basic routines to transfer information between elements within the computer 1102, such as during start-up, is stored in non-volatile memory 1112. In addition, according to present innovations, codec 1135 can include at least one of an encoder or decoder, wherein the at least one of an encoder or decoder can consist of hardware, software, or a combination of hardware and software. Although, codec 1135 is depicted as a separate component, codec 1135 can be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1112 can employ one or more of the disclosed memory devices, in at least some embodiments. Moreover, non-volatile memory 1112 can be computer memory (e.g., physically integrated with computer 1102 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1110 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1102 can also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD), flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to the system bus 1108, a removable or non-removable interface is typically used, such as interface 1116. It is appreciated that disk storage 1114 can store information related to a user. Such information might be stored at or provided to a server or to an application running on a user device. In one embodiment, the user can be notified (e.g., by way of output device(s) 1136) of the types of information that are stored to disk storage 1114 or transmitted to the server or application. The user can be provided the opportunity to opt-in or opt-out of having such information collected or shared with the server or application (e.g., by way of input from input device(s) 1128).

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port can be used to provide input to computer 1102 and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
 a data feature extraction component that employs an adversarial autoencoder to identify and extract first training data features included in a training data set and first target data features included in a target data set;
 a data analysis component that determines a first degree of correspondence between the training data set and the target data set based on comparison of the first training data features and the first target data features;
 a target data acceptability component that determines whether to proceed with application of a target neural network model to the target data set based on the first degree of correspondence, wherein the target neural network model was trained on the training data set;
 a model application component that applies a subset of layers of the target neural network model to the training data set and the target data set based on a first determination that the first degree of correspondence meets a first acceptability criterion; and
 a model feature extraction component that extracts second training data features generated based on application of the subset of layers to the training data set and extracts second target data features generated based on application of the subset of layers to the target data set.

2. The system of claim 1, wherein the data analysis component defines a scope of the training data set based on the training data features and determines the first degree of correspondence based on whether the target data features are within the scope of the training data set.

3. The system of claim 1, wherein the first degree of correspondence indicates a predicted level of accuracy in results generated based on the application.

4. The system of claim 1, wherein the data analysis component determines the first degree of correspondence using a statistical analysis method and a machine learning method.

5. The system of claim 1, wherein the target data acceptability component determines whether to proceed with the application of the target neural network model to the target data set based on the first acceptability criterion.

6. The system of claim 1, wherein based on a second determination that first degree of correspondence fails to meet the first acceptability criterion, the target data acceptability component determines that the application of the target neural network model to the target data set will not generate results with an acceptable level of accuracy and classifies the target data set as inapplicable to the target neural network model.

7. The system of claim 1, wherein the computer executable components further comprise:
 a model analysis component that determines a second degree of correspondence between the second training data features and the second target data features; and
 a model acceptability component that determines whether the application of the target neural network model to the target data set will generate results with an acceptable level of accuracy based on the second degree of correspondence.

8. The system of claim 7, wherein the model analysis component defines a scope of the target neural network model based on the second training data features and determines the second degree of correspondence based on whether the second target data features are within the scope of the target neural network model.

9. The system of claim 7, wherein the model analysis component determines the second degree of correspondence using a statistical analysis method or a machine learning method.

10. The system of claim 7, wherein the data analysis component and the model analysis component respectively determine the first degree of correspondence and the second degree of correspondence using a same statistical analysis method or a same machine learning method.

11. The system of claim 7, wherein the model acceptability component determines that the application of the target neural network model to the target data set will not generate the results with the acceptable level of accuracy based on a second determination that the second degree of correspondence fails to meet a second acceptability criterion.

12. The system of claim 7, wherein the model acceptability component determines that the application of the target neural network model to the target data set will generate the results with the acceptable level of accuracy based on a second determination that the second degree of correspondence meets a second acceptability criterion.

13. A computer-implemented method comprising:
employing, by a system operatively coupled to a processor, an adversarial auto-encoder to identify and extract first training data features included in a training data set and first target data features included in a target data set;
determining, by the system, a first degree of correspondence between the training data set and the target data set based on analysis of correspondences between the first training data features and the first target data features;
determining, by the system, whether to proceed with application of a target neural network model to the target data set based on the first degree of correspondence, wherein the target neural network model was trained on the training data set;
based on a first determination that the first degree of correspondence meets a first threshold degree of correspondence, extracting, by the system, second training data features generated based on application of a subset of layers of the target neural network model to the training data set; and
extracting, by the system, second target data features generated based on application of the subset of layers of the target neural network model to the target data set.

14. The computer-implemented method of claim 13, wherein the first degree of correspondence indicates a predicted level of accuracy in results generated based on the application.

15. The computer-implemented method of claim 13, further comprising:
based on a second determination that the first degree of correspondence fails to meet the first threshold degree of correspondence, determining, by the system, that the application of the target neural network model to the target data set will not generate results with an acceptable level of accuracy; and
classifying, by the system, the target data set as inapplicable to the target neural network model.

16. The computer-implemented method of claim 13, further comprising:
determining, by the system, a second degree of correspondence between the second training data features and the second target data features; and
determining, by the system, whether the application of the target neural network model to the target data set will generate results with an acceptable level of accuracy based on whether the second degree of correspondence meets a second threshold degree of correspondence.

17. A non-transitory machine-readable storage medium, comprising executable instructions that, when executed by a processor, facilitate performance of operations, comprising:
employing a machine learning model to extract first training data features included in a training data set and first target data features included in a target data set;
determining whether the target data set is within a defined data scope of the training data set based on analysis of first correspondences between the first training data features and the first target data features;
determining whether application of the target data set to a target neural network model developed using the training data set will generate results with an acceptable level of accuracy based in part on whether the target data set is within the defined data scope of the training data set, wherein based on a first determination that the target data set is within the defined data scope of the training data set based on satisfaction of a first acceptability criterion for the first correspondences, the operations further comprise:
extracting second training data features generated based on application of a subset of layers of the target neural network model to the training data set; and
extracting second target data features generated based on application of the subset of layers of the target neural network model to the target data set.

18. The non-transitory machine-readable storage medium of claim 17, wherein the operations further comprise:
determining whether the target data set is within a defined model scope of the target neural network model based on analysis of second correspondences between the second training data features and the second target data features.

19. The non-transitory machine-readable storage medium of claim 18, wherein the analysis of the first correspondences and the second correspondences comprises employing a statistical analysis method or a machine learning method.

20. The non-transitory machine-readable storage medium of claim 17, wherein based on a second determination that the target data set is outside the defined data scope of the training data set based on unsatisfaction of the first acceptability criterion for the first correspondences, the operations further comprise:
determining that the application of the target neural network model to the target data set will not generate the results with the acceptable level of accuracy; and
classifying the target data set as inapplicable to the target neural network model.

* * * * *